(12) United States Patent
Byers et al.

(10) Patent No.: US 9,953,417 B2
(45) Date of Patent: Apr. 24, 2018

(54) BIOMARKER METHOD

(71) Applicant: The University of Manchester, Manchester (GB)

(72) Inventors: Richard John Byers, Manchester (GB); Christopher Rose, Manchester (GB)

(73) Assignee: The University of Manchester, Manchester (GB)

( * ) Notice: Subject to any disclaimer, the term of this patent is extended or adjusted under 35 U.S.C. 154(b) by 0 days.

(21) Appl. No.: 15/027,183

(22) PCT Filed: Oct. 3, 2014

(86) PCT No.: PCT/GB2014/052991
§ 371 (c)(1),
(2) Date: Apr. 4, 2016

(87) PCT Pub. No.: WO2015/049534
PCT Pub. Date: Apr. 9, 2015

(65) Prior Publication Data
US 2016/0239960 A1  Aug. 18, 2016

Related U.S. Application Data

(63) Continuation-in-part of application No. 14/046,651, filed on Oct. 4, 2013, now Pat. No. 9,519,823.

(51) Int. Cl.
*G06T 7/00* (2017.01)
*G06K 9/00* (2006.01)
(Continued)

(52) U.S. Cl.
CPC .......... *G06T 7/0012* (2013.01); *G06K 9/0014* (2013.01); *G06K 9/00147* (2013.01);
(Continued)

(58) Field of Classification Search
CPC ....... G06T 7/60; G06T 7/0012; G06K 9/6267; G06K 9/6244; G06K 9/6215; G06K 9/468; G06K 9/00147; G06K 9/0014
See application file for complete search history.

(56) References Cited

U.S. PATENT DOCUMENTS 4,343,782 A   8/1982 Shapiro
5,782,770 A   7/1998 Mooradian et al.
(Continued)

OTHER PUBLICATIONS

Rose, C. "A statistical framework for analyzing hypothesized interactions between cells imaged using multispectral microscopy and multiple immunohistochemical markers" J Pathol Information 2013; 4 (Suppl):S4 pages.*
(Continued)

*Primary Examiner* — Feng Niu
*Assistant Examiner* — Mia M Thomas
(74) *Attorney, Agent, or Firm* — Seed IP Law Group LLP

(57) ABSTRACT

A spatial distribution of cells or sub-cellular structures of a subject is quantified by receiving image data that includes a plurality of biomarkers and processing the image data to obtain a set of coordinates. Each coordinate denotes the location of a cell or sub-cellular structure represented by a biomarker or combination of biomarkers. The set of coordinates is processed into a two-dimensional symmetric matrix. Each element of the matrix indicates the frequency of a cell or sub-cellular structure represented by a first biomarker or combination of biomarkers being observed within an interaction distance of a cell or sub-cellular structure represented by a second biomarker or combination of biomarkers. A classifier assigns the subject to a group or category based on the matrix. A toxicity and/or efficacy of one or more interventions is assessed based on a comparison of the spatial distribution to one or more predetermined reference or control distributions.

40 Claims, 5 Drawing Sheets

(51) Int. Cl.
*G06T 7/60* (2017.01)
*G06K 9/62* (2006.01)
*G06K 9/46* (2006.01)

(52) U.S. Cl.
CPC ........... *G06K 9/468* (2013.01); *G06K 9/6215* (2013.01); *G06K 9/6244* (2013.01); *G06K 9/6267* (2013.01); *G06T 7/60* (2013.01)

(56) References Cited

U.S. PATENT DOCUMENTS

| | | | |
|---|---|---|---|
| 6,251,616 B1 | 6/2001 | Barbera-Guillem et al. | |
| 7,279,338 B2 | 10/2007 | Kim et al. | |
| 7,711,174 B2* | 5/2010 | Sammak | G06K 9/00127 382/133 |
| 7,899,623 B2 | 3/2011 | Marcelpoil et al. | |
| 7,920,736 B2* | 4/2011 | Sammak | G06K 9/00127 382/133 |
| 8,060,348 B2* | 11/2011 | Cline | G06K 9/0061 382/128 |
| 8,323,177 B2 | 12/2012 | Wong et al. | |
| 8,488,863 B2* | 7/2013 | Boucheron | G06K 9/0014 382/131 |
| 8,711,149 B2 | 4/2014 | Schmidt et al. | |
| 8,989,475 B2* | 3/2015 | Wong | C12N 5/0604 382/128 |
| 2002/0164063 A1 | 11/2002 | Heckman | |
| 2003/0018457 A1 | 1/2003 | Lett et al. | |
| 2005/0009032 A1* | 1/2005 | Coleman | G06K 9/0014 435/6.16 |
| 2005/0074745 A1 | 4/2005 | Clayton et al. | |
| 2005/0266000 A1 | 12/2005 | Bond et al. | |
| 2006/0013454 A1 | 1/2006 | Flewelling et al. | |
| 2006/0039593 A1* | 2/2006 | Sammak | G06K 9/00127 382/133 |
| 2006/0050946 A1 | 3/2006 | Mitchison et al. | |
| 2006/0280352 A1 | 12/2006 | Muschler et al. | |
| 2007/0020697 A1 | 1/2007 | Cualing et al. | |
| 2007/0211928 A1* | 9/2007 | Weng | G01N 30/8624 382/128 |
| 2007/0211958 A1 | 9/2007 | Khazen et al. | |
| 2008/0032321 A1* | 2/2008 | Ginty | C12Q 1/485 435/15 |
| 2008/0033657 A1* | 2/2008 | Cline | G06K 9/0061 702/19 |
| 2008/0272312 A1 | 11/2008 | Tuschel | |
| 2008/0275409 A1 | 11/2008 | Kane et al. | |
| 2008/0298643 A1 | 12/2008 | Lawther et al. | |
| 2008/0305498 A1 | 12/2008 | Milewicz et al. | |
| 2009/0028413 A1 | 1/2009 | Goodwin et al. | |
| 2009/0074267 A1 | 3/2009 | Pedrizzetti et al. | |
| 2009/0175418 A1 | 7/2009 | Sakurai et al. | |
| 2009/0270731 A1 | 10/2009 | Sathyanarayana | |
| 2009/0287076 A1* | 11/2009 | Boyden | A61B 5/0059 600/407 |
| 2010/0002929 A1* | 1/2010 | Sammak | G06K 9/00127 382/133 |
| 2010/0022880 A1 | 1/2010 | Sathyanarayana et al. | |
| 2010/0045432 A1 | 2/2010 | Abe | |
| 2010/0094561 A1 | 4/2010 | Masumura | |
| 2010/0159458 A1* | 6/2010 | Nevanlinna | C12Q 1/6886 435/6.17 |
| 2010/0260406 A1* | 10/2010 | Sammak | G06K 9/00127 382/133 |
| 2010/0298166 A1* | 11/2010 | Alon | A61K 31/4745 506/10 |
| 2011/0010099 A1* | 1/2011 | Adourian | G06F 19/12 702/19 |
| 2011/0044522 A1* | 2/2011 | Fancourt | G06T 7/2033 382/131 |
| 2011/0103657 A1* | 5/2011 | Kang | G06K 9/6215 382/128 |
| 2011/0122138 A1 | 5/2011 | Schmidt et al. | |
| 2011/0124031 A1* | 5/2011 | Hazen | G01N 33/6893 435/29 |
| 2011/0137178 A1 | 6/2011 | Tearney et al. | |
| 2011/0144914 A1* | 6/2011 | Harrington | C12Q 1/6883 702/19 |
| 2011/0268347 A1 | 11/2011 | Staker | |
| 2011/0282181 A1 | 11/2011 | Wang et al. | |
| 2011/0306857 A1 | 12/2011 | Razansky et al. | |
| 2011/0313274 A1* | 12/2011 | Subbarao | A61B 5/04007 600/409 |
| 2012/0220472 A1* | 8/2012 | Kuo | A61K 49/0002 506/8 |
| 2012/0245045 A1* | 9/2012 | Kislin | C12N 15/113 506/9 |
| 2013/0004018 A1 | 1/2013 | Kim et al. | |
| 2013/0121467 A1* | 5/2013 | Cresens | A61B 6/4216 378/62 |
| 2013/0121557 A1 | 5/2013 | Alexandrov | |
| 2013/0171135 A1* | 7/2013 | Andres | G01N 33/57434 424/133.1 |
| 2013/0171644 A1 | 7/2013 | Parker et al. | |
| 2013/0183707 A1 | 7/2013 | Mangoubi et al. | |
| 2013/0230224 A1 | 9/2013 | Claude et al. | |
| 2013/0268290 A1* | 10/2013 | Jackson | G06F 19/28 705/2 |
| 2014/0287947 A1* | 9/2014 | Boniface | G06F 19/18 506/9 |
| 2014/0294279 A1 | 10/2014 | Madabhushi et al. | |
| 2014/0314298 A1* | 10/2014 | Fieremans | G01R 33/56341 382/131 |
| 2015/0119262 A1 | 4/2015 | Scacheri | |
| 2015/0131889 A1 | 5/2015 | Aragaki | |
| 2015/0267259 A1* | 9/2015 | Kuznetsov | C12N 15/111 514/19.3 |
| 2016/0109452 A1* | 4/2016 | Chen | G01N 33/57423 435/7.92 |
| 2016/0121467 A1 | 5/2016 | Ng et al. | |
| 2016/0239960 A1* | 8/2016 | Byers | G06T 7/0012 |
| 2017/0351939 A1* | 12/2017 | Madabhushi | G06K 9/6269 |

OTHER PUBLICATIONS

"Data Mining Algorithms In R/Classification/kNN," Wikibooks, last modified Jan. 9, 2016, retrieved from https://en.wikibooks.org/wiki/Data_Mining_Algorithms_In_R/Classification/kNN and downloaded on Apr. 19, 2016, 4 pages.

"IBM Engineering and Scientific Subroutine Library for AIX, Version 5 Release 1, and IBM Engineering and Scientific Subroutine Library for Linux on Power, Version 5 Release 1.1," *ESSL Guide and Reference*, IBM Corporation, 2012, 82 pages.

Blackford, "Packed Storage," Oct. 1, 1999, retrieved from http://www.netlib.org/lapack/lug/node123.html on Jul. 1, 2015, 1 page.

Camacho et al., "Improved demonstration of immunohistochemical prognostic markers for survival in follicular lymphoma cells," *Modern Pathology* 24:698-707, May 2011.

Haralick et al., "Textural features for image classification," *IEEE Transactions on Systems, Man and Cybernetics*, SMC-3(6):610-621, 1973.

Histopathology Image Analysis (HIMA): Image Computing in Digital Pathology, The University of Warwick full-day workshop in conjunction with MICCAI'2012, Oct. 5, 2012.

inForm—Advanced Image Analysis Software, PerkinElmer, retrieved from http://www.perkinelmer.co.uk/Catalog/Category/ID/InForm%20Advanced%20Image on Jan. 3, 2014.

International Preliminary Report on Patentability, dated Apr. 14, 2016, for corresponding International Application No. PCT/GB2014/052991, 10 pages.

International Search Report, dated Jan. 15, 2015, for corresponding International Application No. PCT/GB2014/052991, 4 pages.

Ishwaran et al., "Random Survival Forests," *The Annals of Applied Statistics* 2(3):841-860, Sep. 2008.

Manthan et al., "Characterization of the interaction of lipid A and lipopolysaccharide with human serum albumin: implications for an

(56) References Cited

OTHER PUBLICATIONS endotoxin carrier function for albumin," *Journal of Endotoxin Research* 2(2):99-106, Apr. 1995.

Nuance FX Multispectral Tissue Imaging System, PerkinElmer, retrieved from http://www.perkinelmer.co.uk/Catalog/ProducUID/130925 on Jan. 3, 2014.

Rose et al., "A statistical framework for analyzing hypothesized interactions between cells imaged using multispectral microscopy and multiple immunohistochemical markers," In proc Histopathology Image Analysis, Oct. 5, 2012.

Rose et al., "A statistical framework for analyzing hypothesized interactions between cells imaged using multispectral microscopy and multiple immunohistochemcial markers," *Journal of Pathology Informatics* 4(Supplement):S4, Mar. 2013, retrieved from http://www.jpathinformatics.org on Dec. 18, 2014, 6 pages.

Rithidech et al., "Protein expression profiles in pediatric multiple sclerosis: potential biomarkers," *Multiple Sclerosis* 15:455-464, Apr. 2009.

Schubert et al., "Analyzing proteome topology and function by automated multidimensional fluorescence microscopy," *Nature Biotechnology* 24(10):1270-1278, Oct. 2006.

Sertel et al., "Computerized microscopic image analysis of follicular lymphoma," Medical Imaging 2008: Computer-Aided Diagnosis, San Diego, CA, Feb. 16, 2008, 12 pages.

J. Duchon, "Splines Minimizing Rotation Invariant Semi-Norms in Sobolev Spaces", 1976, Constructive Theory of Functions of Several Variables, Oberwolfach 1976, W. Schempp and K. Zeller, eds., Lecture Notes in Math., vol. 571, Springer, Berlin, 1977., pp. 85-100.

\* cited by examiner

BIOMARKER METHOD

FIELD OF THE INVENTION

The present invention relates to a new method for quantifying the spatial distribution of cells or sub-cellular structures.

BACKGROUND OF THE INVENTION

It is desirable for both research and clinical reasons to monitor analyse and spatially characterise cellular and sub-cellular patterns. Such patterns may, for example, be monitored, analysed and/or characterised using histological staining and immunohistochemistry.

Immunohistochemistry (IHC) refers to the process of detecting antigens (e.g. proteins) in cells of a tissue sample by exploiting the principle of antibodies binding specifically to antigens in biological tissues. Immunohistochemical staining is widely used in the diagnosis of abnormal cells such as those found in cancerous tumours, since specific molecular markers are characteristic of particular cellular events such as proliferation or cell death. IHC is also widely used in basic research to understand the distribution and localisation of biomarkers and differentially expressed proteins in different parts of a biological tissue.

Visualising an antibody-antigen interaction can be accomplished in a number of ways. Most commonly, an antibody is conjugated to an enzyme, such as peroxidase, that can catalyse a colour-producing reaction. Alternatively, the antibody can be tagged to a fluorophore, such as fluorescein or rhodamine.

Researchers regularly use IHC markers in conjunction with an imaging technique to make diagnostic and prognostic decisions in a range of diseases. To do this, they visually inspect the images and draw on their training and experience to identify the presence or absence of a particular type of cell or sub-cellular structure and the spatial arrangement thereof. This identification is based on visual recognition of particular patterns of distinct cells which are indicative of specific or general cellular processes. It is therefore a subjective technique, completely reliant on the human eye, and as an image is easily affected by factors such as strong background staining, weak target antigen staining and auto fluorescence, decisions vary between researchers and clinicians and except in advanced research centres quantification of an imaged tissue sample is typically limited to counting cells.

Additionally even with sophisticated analysis and visualisation tools, it is difficult for even expert clinicians and/or researchers to interpret images including a plurality of biomarkers. For example, analysis becomes particularly complex once the number of biomarkers exceeds 3 or 4, since as the number of markers increases, the ability of the human eye to distinguish between the different markers decreases. The image characterisation is hampered by stains which may be occurring concurrently in cells close together, interacting or expressed by the same cell.

An alternative technique for this analysis of multiple biomarkers is tissue microarray (TMA). TMAs consist of paraffin blocks in which up to 1000 separate tissue cores are assembled in array fashion to allow multiplex histological analysis. In the technique, a hollow needle is used to transfer tissue cores as small as 0.6 mm in diameter from regions of interest in the paraffin-embedded tissues, into one paraffin "master" block in a precisely spaced, array pattern. Sections from this "master" block are cut using a microtome, set onto glass slides, stained and analysed as for standard microscopy slides. Each microarray block can be cut into 100-500 sections which can be subject to independent tests.

Unfortunately, however, TMA has several limitations. Firstly the results are averaged over the whole sample meaning that if only a subsection of cells concentrated in one section of the sample drives the disease, this can be missed; and secondly, the sample is small so in a heterogeneous cell population (such as in a tumour), important information may be missed.

It is particularly desirable to obtain information on the spatial patterning of the markers and cells or sub-cellular structures. This patterning gives an indication of the type of cell-cell interaction occurring, and can provide useful information with regard to the diagnosis or prognosis of a subject.

Currently available methodology does not, however, allow spatial patterning to be analysed with more than a handful of biomarkers. IHC techniques, for example, provide one image for each stain but whilst it is believed that cells with particular IHC profiles may interact, there are few quantitative methods available for investigating these hypotheses.

The above-mentioned problems are addressed by the present invention.

SUMMARY OF THE INVENTION

The invention is defined in the appended claims.

Provided herein is a computer-implemented method for quantifying the spatial distribution of cells or sub-cellular structures, the method comprising the following steps performed by a computer: (a) receiving for a subject image data comprising a plurality of biomarkers, N, wherein the data represents a spatial map of the biomarkers; (b) processing the data to obtain a set of coordinates, wherein each coordinate denotes the location of a cell or sub-cellular structure represented by a biomarker or combination of biomarkers; (c) processing the set of coordinates into a two-dimensional symmetric $(2^N-1) \times (2^N-1)$ or $2^N \times 2^N$ matrix (D), wherein each element (i, j) of the matrix indicates the frequency of a cell or sub-cellular structure represented by a first biomarker or combination of biomarkers (i) being observed within an interaction distance, $d_I$, of a cell or sub-cellular structure represented by a second biomarker or combination of biomarkers (j), and wherein i and j may be the same or different; and (d) using a classifier to assign the subject to a group or category based on the two-dimensional symmetric matrix (D).

Also provided herein are a computer program, computer program product, and apparatus for implementing the above method, and various uses or applications for exploiting the method.

Figure 1:
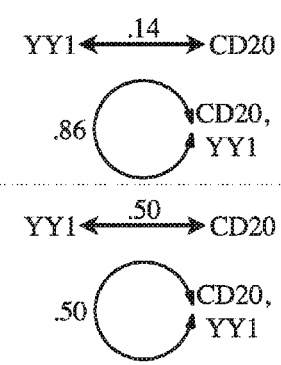
FIG. 1 contains two matrices ($D_1$ and $D_2$) and their corresponding graphs for two biomarkers YY1 and CD20 and the combination thereof CD20,YY1.

YY1 together with CD20 can be used to determine survival of follicular lymphoma, and as described in more detail in the examples, low Shannon entropy has been found by the inventors to be associated with poor survival of this disease. Matrix $D_1$ in FIG. 1 is therefore an example of subjects with poor survival of follicular lymphoma and matrix $D_2$ is an example of subjects with good survival of follicular lymphoma.

The elements in the matrices represent the relative frequency (probability estimate) of a cell represented by CD20, YY1 or CD20,YY1 being observed within an interaction distance of a cell represented by CD20, YY1 or CD20,YY1. It can be seen that for a subject with poor survival ($D_1$) there is a higher probability of observing a cell represented by CD20,YY1 within an interaction distance of another cell represented by CD20,YY1, than observing a cell represented by CD20 within an interaction distance of a cell represented by YY1. Whereas for a subject with good survival ($D_2$), there is an equal probability of observing the three possible cellular interactions (YY1:CD20; CD20:YY1 and CD20, YY1:CD20,YY1).

A matrix can also be visualised as a graph. Vertices of a graph represent cells or sub-cellular structures represented by a biomarker or combination of biomarkers (cell types) (e.g., CD20, YY1 or CD20,YY1) and edges represent pairings of cell types and correspond to entries in the matrix. Edges can be annotated with the associated probability. Graphs allow matrices to be visualised diagrammatically and can aid in interpreting the associated matrices.

Figure 2:
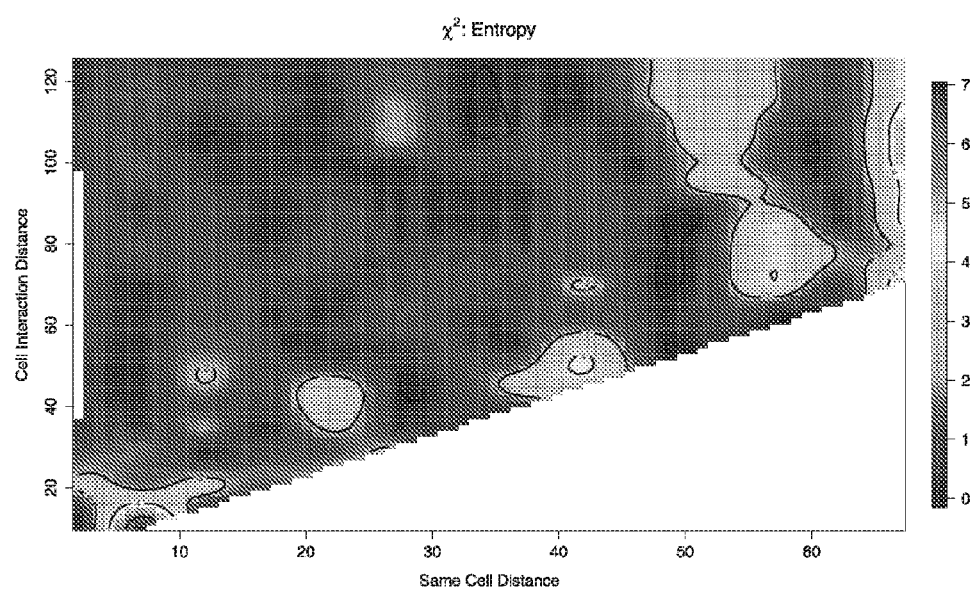

FIG. 2 is a contour plot or map for the statistical function $\chi^2$ of the scalar summary statistic Shannon entropy, H(D), as a function of pairing distance (same cell distance), $d_p$, and (cell) interaction distance, $d_I$. The contour plot shows the topology of the objective function for H(D) under the constraint that pairing distance<interaction distance.

The contour plot of FIG. 2 was obtained for Example 1 by defining a regular grid over the space of pairing and interaction distances, under the above constraint. Formula (1) (defined above) was evaluated at each grid point. The value of $\chi^2$ for a grid point was taken to be the value of $\chi^2$ corresponding to the optimal threshold value at that grid location. Finally, the plot was constructed using thin plate spline interpolation to approximate the values of $\chi^2$ between the grid points. Thin plate spline interpolation is known in the art and described for example, in J. Duchon. 1976, *Splines minimizing rotation invariant semi-norms in Sobolev spaces*, pgs 85-100, In: Constructive Theory of Functions of Several Variables. Oberwolfach 1976, W. Schempp and K. Zeller, eds., Lecture Notes in Math., Vol. 571, Springer. Berlin. 1977.

The skilled person in the art would understand that there are other methods for constructing this contour plot to optimize the values of the pairing distance and the interaction distance, including for example nearest-neighbour, bilinear or bicubic interpolation.

Regions of high $\chi^2$ (the top end of the key shown on the right hand side of FIG. 2) correspond to pairing and interaction distances which yield matrices that, when summarised using H(D), allow the subjects to be assigned to groups that differ in survival to a greater extent compared to those corresponding to regions of low $\chi^2$ (the lower end of the key shown on the right hand side of FIG. 2). Such a plot allows an optimal pairing and interaction distance to be chosen visually, by identifying a pairing and interaction distance that correspond to a high value of $\chi^2$, favouring (0,0) and hence enables subjects to be assigned to groups with statistically significantly different survival. The highest $\chi^2$ for this figure (although not marked on the figure) is at "7" on the key and corresponds to an optimal pairing and interaction distance of $(d_p*,d_I*)=(7, 10)$.

Figure 3:
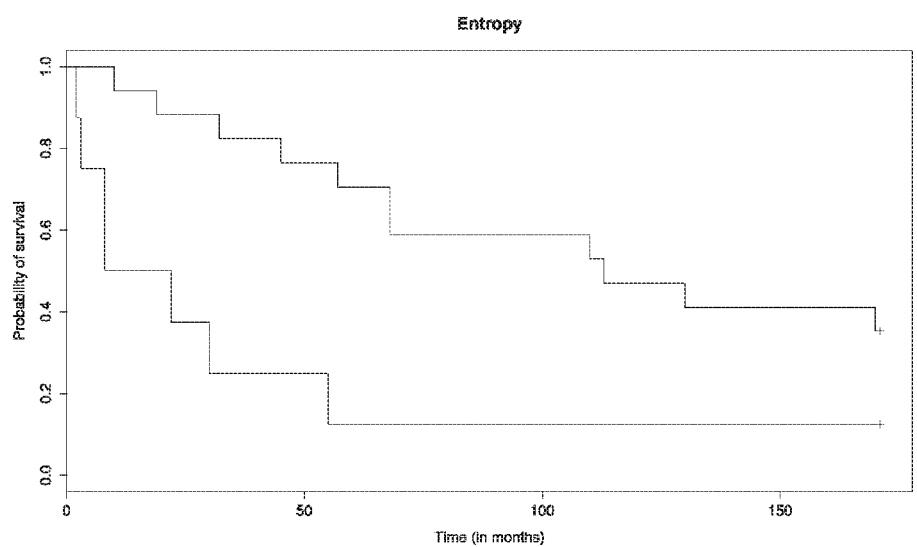

FIG. 3 is a plot of Kaplan-Meier estimates for the probability of survival (%) against time (in months) for Shannon entropy estimated using leave-one-out cross validation as described in Example 1.

Figure 4:
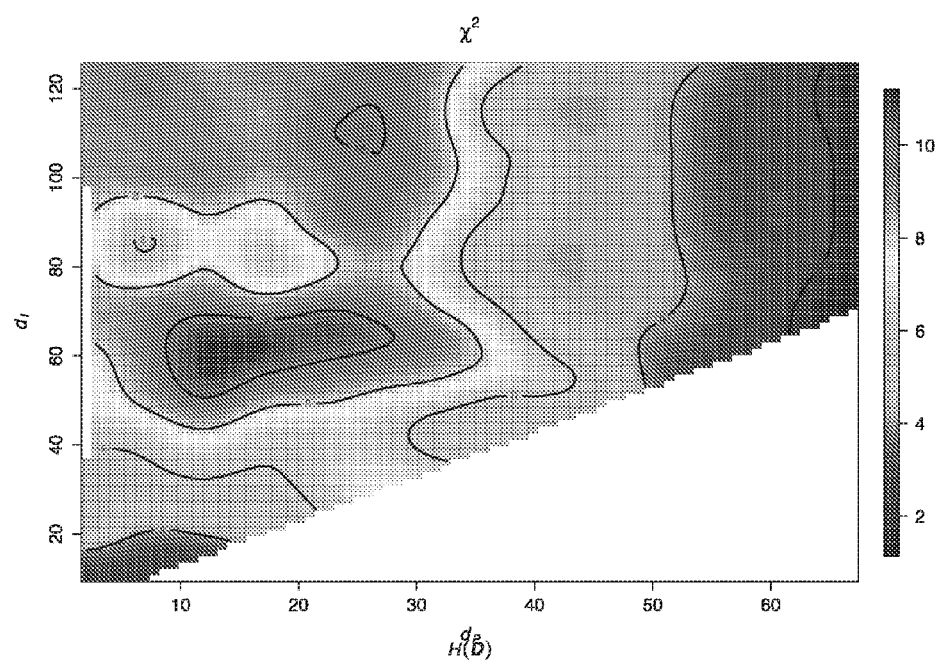

FIG. 4 is a contour plot from Example 2 for the statistical function $\chi^2$ of the scalar summary statistic Shannon entropy, H(D), as a function of pairing distance, $d_p$, and interaction distance, $d_I$, under the constraint that pairing distance<interaction distance. FIG. 4 was obtained by the same method as described above for FIG. 2 except in relation to Example 1. The highest $\chi^2$ for this figure is at "10" favouring (0,0) and corresponds to an optimal pairing and interaction distance of $(d_p*,d_I*)=(13,60)$.

Figure 5:
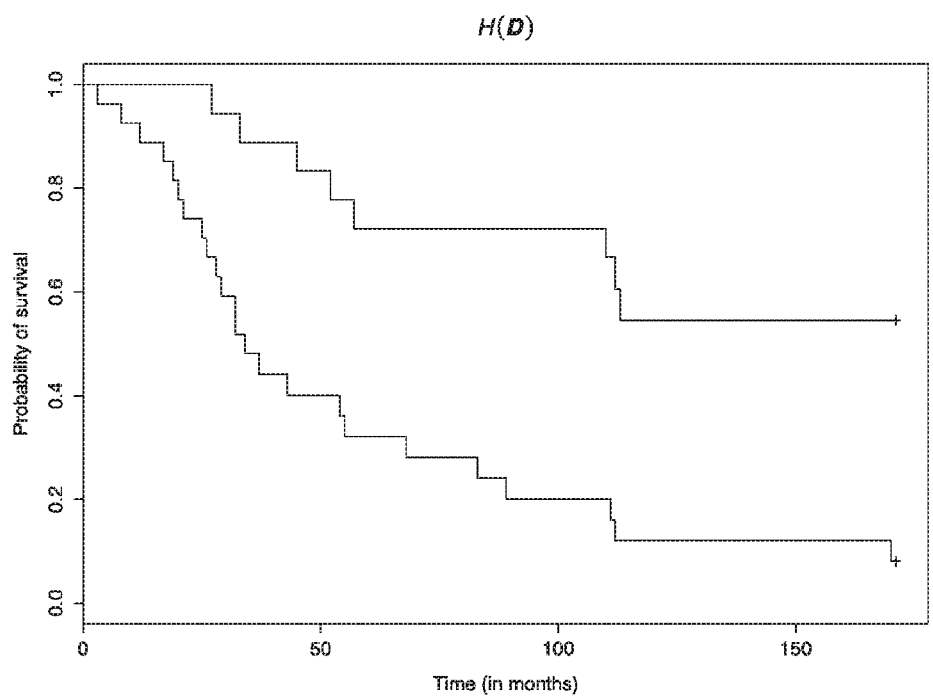

FIG. 5 is a plot of Kaplan-Meier estimates of probability of survival (%) against time (in months) for Shannon entropy estimated using leave-one-out cross validation as described in Example 2.

FIGS. 1 to 5 are discussed in more detail below, particularly in the Examples.

DETAILED DESCRIPTION

The present application provides, inter alia, a method for quantifying the spatial distribution of cells or sub-cellular structures comprising:

a) receiving image data comprising a plurality of biomarkers, N, wherein the data represents a spatial map of the biomarkers;

b) processing the data to obtain a set of coordinates, wherein each coordinate denotes the location of a cell or sub-cellular structure represented by a biomarker or combination of biomarkers; and c) processing the set of coordinates into a two-dimensional symmetric $(2^N-1)\times(2^N-1)$ or $2^N\times2^N$ matrix (D).

In a preferred embodiment of the method, each element (i, j) of the matrix indicates the frequency of a cell represented by a first biomarker or combination of biomarkers (i) being observed within an interaction distance, $d_I$, of a cell represented by a second biomarker or combination of biomarkers (j), and wherein i and j may be the same or different.

This frequency may be an absolute or relative frequency. Preferably it is a relative frequency, otherwise termed a "probability estimate" as described herein.

The set of coordinates obtained in step (b) may be a set of two-dimensional (x,y) coordinates or a set of three-dimensional (x,y,z) coordinates. Preferably they are a set of two-dimensional (x,y) coordinates.

Preferably step (c) of the method may comprise:

i. assigning a binary vector $\pi=(\pi_{s_1}, \ldots \pi_{s_N})$ to each set of coordinates (x,y) to confirm the presence of a biomarker, wherein $s_k$ denotes the kth marker; and ii. assigning a number to each binary vector, wherein the number represents a matrix row or column index number, preferably the number is assigned in this step according to a binary place-value scheme.

In a particularly preferred embodiment, there are more than two biomarkers in the tissue sample (i.e. N is more than two).

Step (b) of the method preferably comprises processing the image data to obtain a set of spatial coordinates (x',y'), wherein each spatial coordinate denotes the location of a group of one or more cells or sub-cellular structures represented by a biomarker or combination of biomarkers.

In order to obtain the final set of coordinates (x,y) which are used in step (c) to form the two-dimensional symmetric matrix, step (b) may further comprise:

processing the image data to obtain (i) a set of spatial coordinates (x',y'), wherein each spatial coordinate denotes the location of a group of one or more cells or sub-cellular structures represented by a biomarker or combination of biomarkers, and (ii) a set of region areas, wherein each area represents the two-dimensional surface of each group represented by a biomarker or combination of biomarkers;

defining a maximum area for individual cells or sub-cellular structures in the image;

discarding groups with region areas larger than the maximum area; and combining the remaining spatial coordinates (x',y') that are within a pairing distance, $d_P$, of each other to obtain the set of (x,y) coordinates.

In the method, step (c) may further comprise forming a two-dimensional, symmetric intermediate matrix, wherein each element of the matrix indicates the distance between a particular combination of coordinates (x,y), and discarding, for each row or column of the matrix, the entries equal to zero or greater than the interaction distance $d_I$.

The method may also comprise a step (d) of generating a scalar summary statistic from the matrix (D).

Preferably the scalar summary statistic is selected from: energy, $D_E = \Sigma_{i \leq j,j} D_{i,j}^2$; Shannon entropy, $H(D) = -\Sigma_{i \leq j,j} D_{i,j} \log_b D_{i,j}$, where base, b, is preferably equal to 2; and the maximum $D_{max} = \max_{i,j} D_{i,j}$.

When the method includes step (d) of generating a scalar summary statistic, step (d) preferably further comprises averaging the scalar summary statistic and relating that average to one or more biological or clinical characteristic. Preferably the average value taken is the median.

In this embodiment, the average is preferably related to one or more biological or clinical characteristic by applying one or more thresholds to the average value. More preferably, the threshold is determined via optimisation and statistical survival analysis. For example, the optimisation of the threshold may be determined according to formula (1):

$$\gamma_T^* = \underset{\gamma_T}{\mathrm{argmax}}\, \chi^2(s, g_{\gamma_T}(\gamma))$$

wherein for each summary statistic of n subjects the vector $\gamma = (\gamma_1, \ldots, \gamma_n)$;

wherein $\chi^2(s, g)$ is a function returning a test statistic of a survival analysis of subjects with survival times $s = (s_1, \ldots, s_n)$ assigned to groups $g = (g_1, \ldots, g_n)$, wherein $g_i$ is a member of a set of two or more survival groups, and wherein the test statistic is maximised when the groups are maximally distinct in terms of their survival characteristic; and wherein the function $g_{\gamma_T}$ returns a vector whose ith element is the group assignment of the ith subject resulting from the application of threshold $\gamma_T$ to each element of the vector $\gamma$.

The method preferably involves obtaining the image data from a tissue sample, wherein the tissue sample is preferably isolated from a subject. More preferably the tissue sample is isolated from a tumour, preferably a malignant tumour.

In a second aspect, the present application provides the use of the method as described hereinabove for assigning to a subject one or more clinical characteristic. The characteristic is preferably associated with survival of a disease, more preferably the characteristic is categorical. For example, the characteristic may be a category that indicates how long the subject may survive after a clinical event associated with the disease, e.g. an event associated with the diagnosis and/or prognosis of a disease before, after or during treatment including diagnosis, relapse or remission. Most preferably, the category indicates short or long survival of a disease.

In a third aspect, the present application provides the use of the method as described hereinabove for forming and/or testing scientific hypotheses for one or more interventions. Preferably the scientific hypotheses are associated with diagnosis or prognosis or treatment of a disease. Preferably this use involves optionally applying the one or more interventions to a subject; quantifying the spatial distribution of cells or sub-cellular structures of the subject according to the method described hereinabove; and comparing said quantified spatial distribution to one or more predetermined references or controls for said one or more interventions, wherein the comparison is indicative of said scientific hypothesis. Most preferably, this use further comprises quantifying the spatial distribution of cells or sub-cellular structures of the subject before applying the one or more interventions.

In a fourth aspect, the present application provides a computer program for performing all the steps of the method described hereinabove.

In a fifth aspect, the present application provides a computer program product comprising the computer program described above on a computer readable storage medium.

In a sixth aspect, the present application provides apparatus arranged to implement the method described above. The apparatus comprising at least one processor configured to perform the method for quantifying the spatial distribution of cells or sub-cellular structures comprising:

a) receiving image data comprising a plurality of biomarkers, N, wherein the data represents a spatial map of the biomarkers;

b) processing the data to obtain a set of coordinates, wherein each coordinate denotes the location of a cell or sub-cellular structure represented by a biomarker or combination of biomarkers; and c) processing the set of coordinates into a two-dimensional symmetric $(2^N-1) \times (2^N-1)$ or $2^N \times 2^N$ matrix (D), wherein each element (i, j) of the matrix indicates the frequency of a cell represented by a first biomarker or combination of biomarkers (i) being observed within an interaction distance, $d_I$, of a cell represented by a second biomarker or combination of biomarkers (j), and wherein i and j may be the same or different.

The apparatus may comprise means for imaging a sample, e.g. a microscope, and a computer program product comprising the computer program described above on a computer readable storage medium.

Broadly speaking, the approach described herein characterises cellular patterns by forming a matrix which gives an indication as to the absolute or relative frequency with which pairs of cellular or sub-cellular structures, with particular biomarkers or similar characteristics, may be observed proximal to one another. The matrix provides a quantitative description of the pattern of cells and their possible interactions.

Some aspects of the method have been published by the inventors at the Histopathology Image Analysis (HIMA) workshop held in Nice, France on 5 Oct. 2012: C J Rose, K Naidoo, V Clay, K Linton, J A Radford. R J Byers, *A statistical framework for analyzing hypothesized interactions between cells imaged using multispectral microscopy and multiple immunohistochemical markers*, In proc Histopathology Image Analysis, 5 Oct. 2012; and in C J Rose, K Naidoo, V Clay, K Linton. J A Radford, R J Byers, *A statistical framework for analyzing hypothesized interactions between cells imaged using multispectral microscopy and multiple immunohistochemical markers*, J Pathol Inform, 30 Mar. 2013.

Both of these inventor publications are incorporated herein by reference.

Cells or Sub-Cellular Structures

As used herein, "a cell" refers to an individual cell, or a sub-cellular structure or compartment. By sub-cellular structure or compartment is meant features within a cell which are situated or occurring within a cell, as is known in the art. Such sub-cellular structures or compartments include, for example, the nucleus, cytoplasm, organelles, mitochondria, endoplasmic reticulum, chloroplast, vacuole and Golgi body. Where the term "sub-cellular structure" is used, it should be interpreted as referring to sub-cellular structures and compartments.

In Silico, In Vivo, In Vitro or Ex Vivo Method

The methods described herein may be carried out as appropriate in silico, in vivo, in vitro or ex vivo. The in vivo method may involve a human or non-human subject.

The in vitro method may involve obtaining image data for a tissue sample isolated from a subject. The tissue samples (or sections) may be derived from various types of tissue. In a preferred embodiment, the tissue section is taken from biopsies for a particular type of disease. The subject is preferably human but may also be non-human.

The biopsy may be performed before the subject has received treatment for a particular disease, or after treatment has already commenced, for instance in order to decide whether to continue the treatment, or equally when treatment has finished.

Multiple tissue samples may also be isolated from each subject in order to avoid a small tissue sample being unrepresentative of the subject from which it was taken.

The tissue samples can be obtained from any type of tissue. The tissue may be human or animal tissue and may be connective, muscle, nervous or equally epithelial tissue. For example the tissue may be blood or bone tissue, visceral or smooth muscle tissue, skeletal muscle tissue, cardiac muscle tissue, neural tissue or squamous epithelium, cuboidal epithelium, columnar epithelium, glandular epithelium, or ciliated epithelium tissue. The tissue may for example be obtained from the immune system, from an organ such as the kidney or liver, or from a tumour. The tissue may also be obtained from a healthy subject or from a subject suffering from a disease, equally the tissue may be obtained pre- or post-mortem. If obtained from a tumour, the tissue sample may be obtained from a malignant tumour and most preferably a lymph node.

After isolation, the tissue samples may be stained with more than one (i.e. at least two) biomarker, as is known in the art. Biomarkers are also referred to herein as "markers", "stains", "immunohistochemical markers" or "IHC markers". The skilled person will understand that the method of the present application can use any type of biomarker known in the art. The biomarker may be an immunohistochemical marker such as for example CD20, YY1, FOXP3, CD3, CD69 or mixtures thereof.

The skilled person will also appreciate that the method of the present application may be applied to any type of disease.

The disease may be selected from cancer; an inflammatory disorder; diabetes; HIV/AIDS; Alzheimer's disease; asthma; meningitis; bronchitis; bacterial, viral, fungal, and protozoal infections; Crohn's disease; erectile dysfunction; heart disease; infertility; keloids; visual impairment; obesity; osteo- and rheumatoid arthritis; osteoporosis; Parkinson's disease; anaemia; and schizophrenia. The method is applicable to any type of cancer. For instance, the cancer may be breast cancer, liver cancer, ovarian cancer, gastric cancer, bladder cancer, colon cancer, prostate cancer, lung cancer, nasopharyngeal carcinoma, cervical carcinoma, skin cancer, brain cancer including neuroblastoma and glioma, solid tumours, hematologic malignancies including leukaemia and lymphoma, or head and neck cancer including squamous cell carcinoma of the lip, mouth, nasal cavity, pharynx, larynx, thyroid, paranasal sinuses, salivary glands or cervical lymph nodes of the neck.

For example the disease may be cancer. e.g. lymphoma such as follicular lymphoma.

Alternatively the method may be carried out in silico. In other words, the method may be performed on a computer or via computer simulation, in which case a tissue sample may not be required. The computer may be used to simulate the cells of the system of interest, including any biological, chemical, or physical interventions.

The method described herein may be implemented as a computer program running on general purpose hardware, such as one or more computer processors. In some implementations, at least part of the computer program may run on specialised hardware particularly suited for image processing, such as a GPU (graphics processing unit). In some implementations, the approach described herein may be implemented at least in part using dedicated hardware (rather than software). In some implementations, the functionality described herein may be implemented by a stand-alone computing system. In other implementations, the functionality may be provided by (integrated into) an imaging system, for example a system suitable for any of the imaging techniques discussed below.

Imaging Techniques

The method includes receiving image data wherein the data represents a spatial map of a plurality of biomarkers. N, N denotes the number of biomarkers and N may be an integer up to 500, up to 200 or up to 100. N may be an integer up to 50, up to 40, up to 30, up to 20, up to 15 or up to 10. For example N may be 2, 3, 4, 5, 6, 7, 8, 9 or 10. Most preferably N is more than 2, more than 3, more than 4 or more than 5.

Such image data may be obtained from any imaging technique that allows biomarker positivity (i.e. the representation of a cell or sub-cellular structure by a biomarker or combination of biomarkers) to be spatially-mapped. Such spatial mapping may be two or three-dimensional. Suitable techniques will be known to a person skilled in the art. The techniques may be invasive or non-invasive and may include optical imaging, imaging probes, multispectral microscopy, confocal microscopy, acoustic microscopy, Raman spectroscopy, in-situ mass spectrometry, electron microscopy and spatially resolved spectroscopy.

Preferably the image data is obtained from multispectral, confocal or electron microscopy or spatially resolved spectroscopy. e.g. multispectral microscopy.

More than one image may be obtained for a particular subject. For example, the in vitro method may include imaging stained tissue samples multiple times and/or from different portions of the tissue sample to ensure that spatial characteristics of the cellular patterns are representative.

As used herein, "multispectral microscopy" refers to an imaging technique in which a section is imaged multiple times; each time illuminated using a distinct and narrow range of wavelengths. The result is a "cube" of optical density data, or equivalently a spectrum of optical densities at each pixel location. This data can be processed to identify regions, groups of cells and/or individual cells or sub-cellular structures that are positive for particular markers. By the term "positive for particular markers" is meant that a cell is represented by a biomarker or a combination of biomarkers.

Processing the Image Data

The method of the described herein includes a step of processing the image data in order to obtain a set of coordinates, wherein each coordinate represents an approximation of the location of each cell or sub-cellular structure (or group of one or more cells or sub-cellular structures) in the image represented by a biomarker or combination of biomarkers.

The set of coordinates may be a set of two-dimensional (x,y) coordinates or a set of three-dimensional (x,y,z) coordinates. It will be assumed hereafter that the coordinates are two-dimensional, however it will be realised that the method is not limited in this respect.

The image data is processed by means for determining whether each cell or sub-cellular structure or group thereof is positive (1) or negative (0) for each marker or combination of markers, in order to obtain a coordinate for each cell or sub-cellular structure or group thereof. The means for processing the data may be via thresholding of optical densities as is known in the art, or may preferably be by the use of commercially available software, such as Nuance® or inForm®.

Nuance®

The Nuance® FX Multispectral Tissue Imaging System (PerkinElmer, Waltham, Mass., USA; http://www.perkinelmer.co.uk/Catalog/Product/ID/130925) is an integrated imaging and analysis system which can be used as an add-on to the microscope and/or as a piece of computer software. It captures, un-mixes and quantifies immunohistochemistry stains in bright field and also in immunofluorescence images.

It is based on a liquid-crystal tuneable filter based system and works on a pixel-based optical density approach. This means that it is the per-pixel optical density concentration of chromogen that is measured to quantify the amount of antigen on a region of interest basis.

The Nuance® FX Multispectral Tissue Imaging System (also referred to herein as "Nuance®") produces for a given subject and for each marker or combination of markers, a spatial or region centroid coordinate (x',y'). This coordinate indicates each "region" the software considers as being distinct from other such regions for that marker or combination of markers. The spatial coordinate (x',y') may therefore be defined as indicating the location of a group of cells or sub-cellular structures represented by a biomarker or combination of biomarkers.

inForm®

The method of the present application may alternatively use inForm®—Advanced Image Analysis Software (Perkin Elmer, Waltham, Mass., USA; http://www.perkinelmer.co.uk/Catalog/Category/ID/InForm%20Advanced %20Image %20Analysis %2 0Software). inForm® processes multispectral microscopy image data, and can be used alone or in combination with any other commercial available software, e.g. in combination with Nuance®.

inForm® is a cytometric image analyser which calculates mean optical densities for the wavelengths of light associated with each marker or combination of markers over the area of the cell (or its nuclear or cytoplasmic area). The software first carries out nuclear segmentation, then a cell-membrane marker in another spectral channel is used to define the cell membrane and the resulting nuclear and membrane boundaries are finally utilized to define the cytoplasmic area by use of an adaptive algorithm that switches between different cell-based models.

The inForm® software is object-based and provides two main advantages over Nuance®. Firstly it segments individual cells or sub-cellular structures, and secondly it provides a positive/negative determination for particular biomarkers. Unlike Nuance®, inForm® is able to identify individual cells or sub-cellular structures with high accuracy and can report the marker or combination of markers for which each cell is positive. The data yielded from inForm® therefore differs from Nuance® in that the (x,y) coordinates are based on the position of the cell or sub-cellular structure itself.

Since inForm® is able to provide coordinates (x,y) for each cell or sub-cellular structure, such analyses involves large volumes of data. To facilitate this analysis, data may be stored in a relational database (e.g. SQLite; Hipp, Wyrick, & Company Inc., NC, USA), and a structured query (SQL) may be used to efficiently read data as required.

The data used in the present application may be described as "metadata". It may include all data about the coordinates, as well as subject survival times, subject progression-free survival times, length of time from a particular clinical event to the end of the study and/or death (e.g. diagnosis, beginning/finishing treatment, relapse or remission), statistical censoring information (whether each subject survived to the end of the study), and data that allows survival data to be matched to the coordinate data. SQL queries may also be used to read only data that can be analyzed (e.g., if survival or other data are missing for one or more subjects, data for those subjects can easily be omitted).

The method of the present application is not, however, limited to this particular storage method of the data. For instance the storage of data may be integral with the imaging software or it may be external to the imaging software and imported/exported as required.

In a preferred embodiment, the processing of the image data in step (b) includes assigning a binary vector to each set of coordinates (x,y) to confirm the presence of a marker or combination of markers. These binary vectors are also referred to herein as "positivity vectors" and their calculation is explained below.

Positivity Vectors

With S denoting a set of N markers and the representation of a cell by a biomarker or combination of biomarkers s, which is a member of S being denoted by $\pi_s$: a positivity vector, $\pi$, describing the representation of a cell for all biomarkers or combinations of biomarkers in S can be defined as the binary vector, $\pi = (\pi_{s_1}, \ldots, \pi_{s_N})$ where $s_k$ denotes the kth marker and N is the number of biomarkers. A positivity vector may also be termed a "combinatorial molecular phenotype (CMP)". For example, a positivity vector for an image stained with three markers may be:

$$\pi = (1,0,0)$$

When no (x, y) coordinates are recorded for cells that are negative for all markers in S, $2^N-1$ positivity vectors may be observed. For example, where there are two biomarkers in the tissue sample, the vectors will be (1,0), (0,1) and (1,1).

Each possible positivity vector may then be assigned a unique number according to a suitable scheme. The unique number represents a matrix row or column index number, thereby allowing mapping between a particular binary vector and a corresponding row or column index in the matrix, D. Given a pair of binary vectors, it should therefore be possible to determine values of i and j that can be used to index the corresponding element (i, j) of the matrix, D. Preferably the numbering scheme is a binary place-value scheme, however, it will be realised that any suitable scheme known in the art may be used.

For example, if we let the right-most element of a positivity vector represent the least significant binary digit, and the next right-most element represent the next least significant digit, and so on, then the vectors (0,1,0), (1,0,0) and (1,1,1) can be numbered 2, 4 and 7 respectively.

A vector (1,0,1) would, under the same binary counting scheme, be numbered 5 (because the right-most position represents units, of which we have one; the central position represents twos, of which we have none; and the left-most position represents fours, of which we have one; hence (1×1)+(0×2)+(1×4)=1+0+5=5. For example, an interaction between cells with positivity vector (1,0,1) and cells with positivity vector (1,0,1) (i.e., interactions between these same types of cell or sub-cellular structures) would enter the matrix at position (5,5). i.e., the matrix element at row 5 and column 5. The interactions between cells or sub-cellular structures of type (1,0,0), which would be numbered 4 under this scheme ((0×1)+(0×2)+(1×4)=+0+4=4), and cells or sub-cellular structures of type (1,0,1) (numbered, 5, as before) would enter the matrix at positions (4,5) and (5,4)—the matrix is symmetrical about its diagonal, hence the information entering at two matrix elements for this case of an interaction between distinct cell types.

Positivity Vector Approximation

Some imaging software, for example inForm®, can automatically and accurately segment individual cells or sub-cellular structures using the full image data. However, other software is limited to segmenting regions from particular sub-bands (biomarkers), giving rise to separate sets of region centroid or spatial coordinates (x', y') for each marker or combination of markers, some of which may encompass multiple cells and/or sub-cellular structures.

Spatial coordinates can, however, still be used to produce coordinates (x,y) for individual cells or sub-cellular structures and thereby result in an approximate positivity vector. This is achieved by processing the image data so as to identify regions that are sufficiently close that they are likely to correspond to the same cell or sub-cellular structure.

Step (b) of the method of the present application may therefore include processing the image data to obtain (i) a set of spatial coordinates (x',y'), wherein each spatial coordinate denotes the location of a group of one or more cells or sub-cellular structures represented by a biomarker or combination of biomarkers, and (ii) a set of region areas, wherein each area represents the two-dimensional surface of each group represented by a biomarker or combination of biomarkers; defining a maximum area for individual cells or sub-cellular structures in the image; discarding groups with region areas larger than the maximum area; and combining the remaining spatial coordinates (x',y') that are within a pairing distance, $d_P$, of each other to obtain the set of (x,y) coordinates.

Specifically after the image data has been processed, the output (containing for example the set of spatial coordinates (x',y'), the set of region areas, and the distance between each spatial coordinate may be exported to a computer program (for example Microsoft Excel, Microsoft Corporation, Redmond, Wash., USA) on the computer performing the method of the present application. Once exported, this data may be filtered to discard those regions with an area greater than the defined maximum area.

The output from the image data may also include maximum and average intensities. Typically these intensities are optical density corrected amounts of histochemical or fluorescent stain, and represent the amount of that stain in an identified region. This optical density may be calibrated to the concentration of stain in an identified region.

The discarding of groups with region areas larger than the maximum area ensures that groups with region areas likely to encompass multiple cells do not compromise further steps of the method.

By "a maximum area" is meant the largest surface area expected for the cells or sub-cellular structures being imaged. These areas will form part of the skilled person's common general knowledge. When measured in pixels, the skilled person would understand that the minimum number of pixels representative of one cell, or the maximum beyond which an area would be considered to comprise more than one cell, is dependent on the magnification and spatial resolution at which the images are taken.

Preferably the (x',y') spatial coordinates may be combined to form the final set of (x,y) coordinates as follows, however it will be appreciated that other methods of combining spatial (x',y') coordinates exist. Having discarded those spatial coordinates (x',y') whose groups have an area larger than the defined maximum, each remaining spatial coordinate (x',y') is considered in turn. For each spatial coordinate (x',y'), the distance between that pair and all other remaining spatial coordinates (x',y') is computed. Spatial coordinates (x',y') that are within distance $d_P$ of the spatial coordinate being considered are combined with said spatial coordinate to form a single coordinate (x,y). This combination is made preferably by calculating an average of the spatial coordinates. Preferably this average is the mean.

The binary value of each element of the associated binary vector may be determined as follows. The binary vectors of the coordinates being combined are considered. Corresponding elements of these binary vectors are then considered. If these elements indicate that one or more of the coordinates being combined is positive for the biomarker or combination of biomarkers corresponding to that element then that element of the associated binary vector is set to indicate that the single (combined) coordinate is positive for that biomarker or combination of biomarkers. The resulting approximated binary vectors are then assigned a number in the same way as described hereinabove.

By "pairing distance", notated as $d_p$, is meant a distance within which regions of cells or sub-cellular structures represented by distinct markers or combinations of markers should be considered to approximately correspond to the same cell or sub-cellular structure. The pairing distance, $d_P$, may be chosen statistically as explained in more detail below, or it may be obtained from the skilled person's knowledge for a particular disease and/or cell type. When measured in pixels (as in the Examples), the skilled person would understand that this distance is dependent on the magnification and spatial resolution of the image being considered.

Forming a Two-Dimensional Symmetric Matrix (D)

The method of the present application further includes a step of using the set of coordinates (x,y) to form a two-dimensional symmetric matrix (D). This matrix is assigned the notation "D" and is also defined herein as the "hypothesized interaction distribution matrix" or "HID matrix".

The HID matrix may be a $(2^N-1)\times(2^N-1)$ or $2^N\times2^N$ matrix, with N equal to the number of biomarkers spatially mapped in the image. In the case that some cells or sub-cellular structures may be negative for all N biomarkers, such cells or sub-cellular structures will not be represented by any (x,y) coordinates so cannot be counted as described below. In such a case there will be no entries in the matrix for such cells or sub-cellular structures, and hence the matrix does not need to have a row and a column corresponding to such cells or sub-cellular structures and may be of $(2^N-1) \times (2^N-1)$.

Without wishing to be bound by theory, the inventors believe that two cells, sufficiently close together and with identical or different positivity vectors, may interact to varying degrees. This is termed a hypothesised interaction. By extension, the inventors believe that if a particular hypothesised interaction acts this way, then many such pairs of cells will have a larger effect on one or more biological or clinical characteristics of a subject. e.g. outcome. The forming of a $(2^N-1) \times (2^N-1)$ or $2^N \times 2^N$ matrix formalises this notion of hypothesised interaction and quantifies its occurrence. It is an important and advantageous aspect of the method of the present application that it is able to take these pair-wise cell interactions into account when characterising a cellular pattern.

Haralick et al., *Textural Features for Image Classification*, IEEE TRANSACTIONS ON SYSTEMS, MAN AND CYBERNETICS, Vol. SMC-3, No. 6, November 1973, pp. 610-621 describe a general procedure for extracting textural properties from blocks of image data. A set of grey-tone spatial-dependence probability distribution matrices are computed for a given image block, and a set of 14 textural features then extracted from each of these matrices to provide information about image textural characteristics such as homogeneity, linear structure, contrast, number and nature of boundaries present and the complexity of the image.

In a preferred embodiment, each element (i, j) of the matrix indicates the absolute or relative frequency by which a cell or sub-cellular structure represented by a first biomarker or combination of biomarkers (i) (type i) is observed within a given interaction distance, $d_I$, of a cell or sub-cellular structure represented by a second biomarker or combination of biomarkers (j) (type j). Here, an index (i or j) simply refers to a marker or some combination of markers for which cells may be positive. The indexes i and j may be the same or different.

In an even more preferred embodiment, the matrix elements are relative frequencies. A relative frequency may be considered to be an estimate of the probability, $p_{i,j}$, of a cell or sub-cellular structure represented by a first biomarker or combination of biomarkers (i) (type i) being observed within a given interaction distance, $d_I$, of a cell or sub-cellular structure represented by a second biomarker or combination of biomarkers (j) (type j).

For example, if two markers are used (e.g. CD20 and YY1) and no (x,y) coordinates are available for cells or sub-cellular structures that are negative for both markers, then there are three possibilities for indexes i and j: CD20, YY1 or CD20,YY1, which may be assigned indices 1, 2 and 3 respectively. The 3×3 (with N=2 biomarkers $2^N-1=3$) matrix of relative frequencies would therefore represent estimates of the probabilities of cells or sub-cellular structures represented by CD20, YY1 or CD20,YY1 being observed within a given interaction distance of another cell represented by CD20, YY1 or CD20,YY1. An example of two such matrices is shown in FIG. 1.

As used herein, the "interaction distance" notated as $d_I$ means a distance within which a cell or sub-cellular structure or group thereof can be expected to interact. As regions of or individual markers or combinations of markers are typically paired (i.e. deemed to be the same cell) before considering that paired regions/markers may interact, the pairing distance is usually lower than the interaction distance.

The interaction distance may be selected by the skilled person in the art according to their knowledge of typical cellular interaction distances, i.e. the proximity of cells or sub-cellular structures which can be expected to interact. Preferably, however, the interaction distance is chosen statistically. This statistical method is explained below. When measured in pixels (as in the Examples), the skilled person would understand that the value of the interaction distance depends on the magnification and the spatial resolution of the image under consideration.

In order to form the $(2^N-1) \times (2^N-1)$ or $2^N \times 2^N$ matrix from the numbers assigned to the positivity vectors, a hypothesised interaction y may be denoted by commutative arrow operator $$y = i \stackrel{p}{\leftrightarrow} j$$

for each pair of cells or sub-cellular structures represented by a biomarker or combination of biomarkers (i,j), which are located within the interaction distance of each other. The arrow notation $$i \stackrel{p}{\leftrightarrow} j$$

specifies that a proportion, p, of all cell or sub-cellular structure pairings that are between a cell or sub-cellular structure of type i, and a cell or sub-cellular structure of type j (i and j being defined above). The proportion, p, is also described herein as a probability estimate. The notation of $$y = i \stackrel{p}{\leftrightarrow} j$$

for the hypothesised interactions in the tissue sample is convenient because it can be used for forming graphs which may aid visualisation. Such graphs are shown in FIG. 1.

By calculating p for each possible hypothesised interaction in the tissue sample, a $(2^N-1) \times (2^N-1)$ or $2^N \times 2^N$ matrix (D) may be formed where each (i, j) element is the relative frequency (probability estimate) of observing a cell or sub-cellular structure of type i within an interaction distance $d_I$ of a cell or sub-cellular structure of type j.

The matrix D may be computed as follows. First, a matrix of absolute frequencies, A, is computed. For each element of A, the (i, j) indices of the element are determined. Binary vectors $\pi_i$ and $\pi_j$ corresponding to the values of i and j are determined via the scheme described previously. The (x,y) coordinates of all cells or sub-cellular structures with biomarker positivity vector $\pi_i$ are identified. Each of these coordinates is considered in turn. Given one such coordinate, the (x,y) coordinates of all cells or sub-cellular structures with biomarker positivity vector $\pi_j$ are identified and the number of such coordinates whose distance, d, to the coordinate with biomarker positivity vector $\pi_i$ is $0 < d \leq d_I$ is determined.

This inequality ensures that the cell or sub-cellular structure in question cannot form a pair with itself in the case that i=j.

The total of all such numbers is equal to the number of cell or sub-cellular structure pairs where one member of the pair has biomarker positivity vector $\pi_i$ and the other member has biomarker positivity vector $\pi_j$, and where the two members are within a distance $d_I$ of one another, and where the members are distinct from one another. This total is an absolute frequency and is the value of element (i, j) of the matrix A. The matrix A may be retained and used as D if a matrix of absolute frequencies is required. However, in a particularly preferred embodiment, the matrix D of relative frequencies is computed. The value for element (i, j) of matrix of relative frequencies D may be computed by dividing the value of element (i, j) of the matrix A by the sum of the lower (or equivalently upper) triangular elements of the matrix A, including its diagonal. It will be noted that the matrices A and D are symmetrical (i.e., the value for element (i, j) will be identical to the value for element (j, i)). Consequently a matrix A or D can be formed by calculating values either for its lower or upper triangle and copying the calculated values to their symmetrical elements. Alternatively, only an upper or lower triangle (including the diagonal) may be stored.

If Y is a random variable that represents a hypothesised interaction, then the statistical distribution of Y can be written as Y~D where D is the two-dimensional symmetric $(2^N-1) \times (2^N-1)$ or $2^N \times 2^N$ matrix of frequencies, and "~" means "is distributed as".

In a further embodiment, an intermediate matrix is formed for each tissue sample prior to forming the $(2^N-1) \times (2^N-1)$ or $2^N \times 2^N$ matrix, D. To ensure that no two paired cells or sub-cellular structures are located further from one another than the interaction distance $d_I$, the intermediate matrix contains a distance between every possible pairing of coordinates (x,y) and for each row or column of this matrix (i.e., for each coordinate), only those row entries with distance greater than zero and less than or equal to the interaction distance, $d_I$, are taken further to form the $(2^N-1) \times (2^N-1)$ or $2^N \times 2^N$ matrix, D. In other words, for each row or column of the matrix, the entries equal to zero or greater than the interaction distance, $d_I$, are discarded.

The computation of this intermediate distance matrix may be intractable when there are many cells (and sub-cellular structures). The intermediate distance matrix may require a lot of computer memory, and the computer may take an unreasonable length of time to compute the intermediate distance matrix. An alternative embodiment does not therefore involve the computation of an intermediate distance matrix.

In this alternative embodiment, the number of cells or sub-cellular structures of type i within a given distance to cells or sub-cellular structures of type j is computed directly by computing a list of all the cells or sub-cellular structures of type i or j, and then filtering out those that are the same cell or sub-cellular structure (i.e., interaction distance of zero) or are further apart than the interaction distance. The length of the resulting list is the number of cells pairs, as required. Such a list could be computed and/or filtered by one of several methods known to the skilled person in the art.

In a further embodiment, squared distances may be used throughout. For example, the interaction distance may be $10^2, 20^2, 30^2, 40^2, 50^2, 60^2, 70^2, 80^2, 90^2, 100^2, 110^2, 120^2, 130^2, 140^2$ or $150^2$ pixels, preferably $10^2, 20^2, 30^2, 40^2, 50^2, 60^2, 70^2, 80^2, 90^2, 100^2, 110^2, 120^2$ or $130^2$ pixels, e.g. $10^2, 50^2$ or $110^2$ pixels. As noted above, however, the skilled person would understand that a distance measured in pixels is dependent on the magnification and spatial resolution of the image under consideration. The method is not therefore limited to these interaction distances.

This use of squared distances is based on the observation that the distance between coordinates $(x_1, y_1)$ and $(x_2, y_2)$ is given by $\sqrt{((x_1-x_2)^2+(y_1-y_2)^2)}$ which is monotonic with squared distance, $(x_1-x_2)^2+(y_1-y_2)^2$. The square root operation is relatively computationally expensive (when applied many times as in this method), so the alternative use of squared distances advantageously avoids all square root computations.

As explained above, the matrices used in step (c) of the method of the present application are symmetric. By "symmetric" it is meant that the frequency a cell or sub-cellular structure of type i is observed within the interaction distance of a cell or sub-cellular structure of type j is equal to the frequency a cell or sub-cellular structure of type j is observed within the interaction distance of a cell or sub-cellular structure of type i. In a preferred embodiment of the method, only one triangle of the matrix is therefore computed. The results from that triangle may then be copied into the other triangle of the matrix. Alternatively only the upper or lower triangle may be stored. This is particularly advantageous where there are a large number of biomarkers spatially mapped in the image data (e.g. more than 3 or 4 or 5 biomarkers) since only one triangle of the matrix needs to be formed.

Statistical Analysis of the HID Matrix

In order to obtain information from the computed HID matrices, a statistical analysis may be applied. This analysis is preferably a time-to-event data analysis, for example a survival analysis or a regression analysis.

In one embodiment, the method includes a step d) of generating a scalar summary statistic from the HID matrix. As used herein. "a scalar summary statistic" is a number generated from the matrix which quantifies the spatial distribution of cells or sub-cellular structures in the image. Examples of such statistics include an energy measure (computed from absolute frequencies and called counts, or computed from relative frequencies), the maximum value of the matrix (of either absolute or relative frequencies) and Shannon entropy.

Scalar summary statistics which may be used to characterise the HID matrix are energy, $D_E = \Sigma_{i \leq j,j} D_{i,j}^2$; Shannon entropy, $H(D) = -\Sigma_{i \leq j,j} D_{i,j} \log_b D_{i,j}$; and maximum value $D_{max} = \max_{i,j} D_{i,j}$.

The maximum value $D_{max}$ refers to the entry with the highest value in the matrix. It therefore represents the most frequently observed hypothesised interaction. Energy ($D_E$), refers to the sum of the square of each value in the matrix. These two statistics may be based on the matrix elements being absolute or relative frequencies.

Shannon Entropy, H(D), is defined only for matrices of relative frequencies (probability estimates) and is calculated by taking a logarithm (base b as will be described) of each element in the HID matrix, multiplying these values by the corresponding elements of $D_{i,j}$ and then taking the minus value of the sum of these products.

Entropy is a measure of the uncertainty in a random variable and Shannon entropy quantifies the expected uncertainty or unpredictability of the information contained in a message. The base, b, of the logarithm determines the units in which Shannon entry is measured, as is known to the person skilled in the art. In a preferred embodiment, a base 2 logarithm is used, and the Shannon entropy is measured in "bits". However, it will be realised that other bases may be used. For instance, the base may be e, and the Shannon entropy is measured in "nats", alternatively the base may be 10 and the Shannon entropy measured in "bans".

Shannon entropy therefore estimates variability within a sample, and in the context of the present application, may quantify the uniformity of a HID matrix. This means that a HID matrix representing a random or 'diffuse' distribution of cells or sub-cellular structures positive for a particular marker or combination of markers (more uniform distribution across the image) has a higher entropy value than an HID with a less random or more aggregated pattern (less uniform) since it would require more information, for example, for that matrix to be transmitted or stored.

FIG. 1 shows two example HID matrices. As noted above and seen from FIG. 1, the HID matrices consist of two symmetrical triangles, of which just one is required to form the summary statistic. The indexing used in the above summations thus accounts for this symmetry, and means that only one of these triangles is required to characterise the HID matrix. This is particularly advantageous for the efficiency of the method, particularly in terms of the amount of storage (i.e. computer memory or disk space) that is required.

When the method includes step (d) of generating one or more scalar summary statistics, this step preferably further comprises computing an average for each subject and each summary statistic and relating that average to one or more biologically or clinically useful characteristic. Such characteristics are discussed in more detail below.

Since multiple images may be taken and/or multiple tissue samples imaged for each subject, the average for each summary statistic may be taken over each of the subject's matrices. Preferably the average value is the median, but other measures of central tendency such as the mode or the mean may be used.

Preferably an average may be related to one or more clinical characteristic by application of one or more thresholds to the average. Preferably such a threshold may be determined via optimisation and/or statistical analysis, as will be described. For example, one or more thresholds may be applied to the average scalar summary statistic in order to place a subject into one of two or more groups. The thresholds may typically be chosen to place subjects into groups with maximal accuracy. Preferably the threshold is chosen statistically.

The groups may relate to a subject's condition, e.g. whether or not a subject has a disease, whether or not a subject is pregnant, whether or not a subject will develop a tumor, and optionally this assignment of a condition to a subject may be then used to make a treatment decision, or equally the groups may characterize a clinical feature of a particular disease, e.g. survival time, progression-free survival or survival rate. For example, a threshold may be chosen to best separate subjects with poor vs. good survival.

However, it will be realised that other characteristics are of interest, which may be categorical or continuous in nature, and that summary statistics and their averages may be related to such characteristics in other ways, and that the method is not limited in this respect. Characteristics which may be used in the method are described in more detail herein.

The statistical analysis used in the method of the present application may be time-to-event data analysis involving the analysis of data associated with a clinical event. It is known in the art, for example, that statistical analysis may be used to estimate the survival function from lifetime data. Such analysis is often used in medical research to estimate the fraction of subjects who will survive for a certain amount of time after a clinical event such as diagnosis, or treatment. One example of a statistical analysis method is Kaplan-Meier analysis.

Kaplan-Meier analysis typically involves the combination of a plot of Kaplan-Meier estimates of the survival functions (of two or more subject groups) and the use of one or more hypothesis tests to assess the strength of evidence against the null hypothesis that the survival functions (in the population, not the sample) are identical. A plot of Kaplan-Meier estimates is a series of horizontal steps of declining magnitude which can approach the true survival function for that population. The value of the survival function between successive distinct sampled observations is assumed to be constant. FIGS. 3 and 5 include Kaplan-Meier plots for Examples 1 and 2 respectively.

In the context of the present application, a Kaplan-Meier or similar analysis is not limited to survival data. Since the statistical analysis may be a time-to-event data analysis, a plot of Kaplan-Meier estimates can be computed for any type of event (of two or more subject groups), where the event may be associated with development, diagnosis, and/or treatment of a disease. For example, the plot may be a plot of estimates for the probability of a subject developing a tumor.

While a Kaplan-Meier plot provides a graphical representation of estimates of one or more functions, e.g. survival functions, other estimators exist and the skilled person would be aware that these other estimators could be used in place of Kaplan-Meier in the method of the present application. For example the Nelson-Aalen or Turnbull estimators could be used. Additionally, in the following description the logrank (Mantel-Haenszel) test is used as the hypothesis test, but other hypothesis testing methods exist and could be used instead, such as Gehan-Wilcoxon, Peto, Anderson-Peto, and Tarone-Ware. These again would be known to the skilled person.

The logrank test can be posed in terms of computing a $\chi^2$ test statistic, as will be known to a person skilled in the art. An optimal threshold can then be chosen via a semi- or fully-automated optimisation procedure, described as follows, in which a search over the free parameters of the above method for determining a value of a test statistic is performed, and those parameter values corresponding to an optimal value of the test statistic are selected as being optimal. Such parameters may include one or both of the pairing and interaction distances and the one or more thresholds that are applied to the summary statistics.

The method of the present application may also comprise a validation step to assess the ability of the method to accurately relate one or more summary statistics, or their averages, to one or more biologically or clinically useful characteristic. Validation may be performed using in-sample data, or data collected retrospectively or prospectively. Preferably the validation step comprises cross validation, and more preferably leave-one-out cross validation.

Leave-one-out cross validation is known in the art, and involves: at the ith iteration, leaving the ith subject out of the analysis. A single observation is thereby used from the original sample as the validation data and the remaining observations as the training data. This is repeated such that each observation in the sample is used once as the validation data.

In the context of the present application, a leave-one-out validation may be used where data from each subject may be "left-out" in turn and the remaining "left-in" data used as described above to estimate optimal values for the free parameters of the method (which may include one or both of the pairing and interaction distances, and the one or more thresholds). The optimal values of the free parameters may then be used to construct the one or more HID matrices and one or more summary statistics for the left-out data, and to make a prediction for the left-out subject. This prediction may be an assignment to one or more groups (where the characteristic is categorical), or an assignment of a continuous value (where the characteristic is continuous). For example, the subject may be assigned to one or more survival groups following a survival analysis as described above, or the subject may be assigned a continuous value such as a survival time following a statistical analysis such as regression analysis as described below.

Having performed this procedure for each subject, the prediction made for each subject can be used with their data to perform an analysis that estimates how well the method could be expected to perform in the population rather than on a sample.

The data used in the statistical analysis may be "event data"—data relating to the time between diagnosis or treatment and death or other significant clinical endpoint or event (such as disease progression), or equally "non-event data", for example, related to toxicity, efficacy or other properties of a biological agent (e.g. a drug) in a subject.

The data may be event data such as survival data. The survival times of subjects may be obtained by following subjects until death or until the end of a particular study and recording the resulting survival data. The statistical analysis may then be survival analysis and include estimating the survival functions for each of the groups, using a suitable method as described above, and may also include characterising the performance of the method by testing the null hypothesis of equality between the survival functions of the groups, again using a suitable method as described above.

The result of a time-to-event data analysis e.g. a survival analysis may be one or more of a P-value, a confidence interval, or a credible interval. The scalar summary statistic demonstrating a statistically significant difference between the event functions may be used to assign the subjects into one of the two or more groups.

A P-value is the probability that observed data may arise by chance alone under a specific null hypothesis. For example, a P-value of 0.1 equates to a 1 in 10 chance and a value of 0.05 equates to a 1 in 20 chance. P-values are typically used when testing the null hypothesis that two or more quantities (survival functions, in this case) are equal (or some other null hypothesis, such as the quantities differing by a specific amount). If the probability is high (close to 1) then one would conclude it is highly probable that the data could arise by chance alone if the null hypothesis is true, and therefore that the null hypothesis may indeed be true. If on the other hand the probability is low (close to zero) then one would conclude that it is highly improbable that the data would arise by chance if the null hypothesis is true, and therefore that the null hypothesis is likely to be false.

The skilled person would understand that the choice of a P-value threshold (the significance criterion) depends on numerous factors, in particular the number of comparisons being made. A P-value may be calculated from the value of the test statistic and on properties of the sample (such as how many subjects were involved in the study). The test statistic is a function of the observed data (here, the group memberships and the survival time of each subject). There are many different methods of performing a hypothesis test, and the skilled person knows that this choice depends on the kind of null hypothesis is being tested, and other factors including the type of data being analysed.

Typically in medicine and biology, P-values less than 0.05 result in the null hypothesis being rejected. In the method of the present application, a P-value of less than 0.05 may be applied. A P-value of less than 0.01 or 0.001 may alternatively be applied.

The method of the present application may also include a correction of the P-value. This correction provides additional confidence that the result is not the product of trial and error. Any suitable correction method known in the art can be used, for example the Bonferroni correction. In the Bonferroni correction method, the P-value threshold is made stricter, by dividing the original criterion of e.g. 0.05 by the number of comparisons made. This corrected P-value threshold is then used to determine whether the null hypothesis is to be rejected.

The optimal threshold applied to the average value of the summary statistic may be chosen as follows. Given a vector of values of a particular summary statistic (e.g. $D_{max}$) for n subjects: $\gamma=(\gamma_1, \ldots, \gamma_n)$, an optimal threshold $\gamma_T^*$ may be chosen according to formula (1):

$$\gamma_T^* = \arg\max_{\gamma_T} \chi^2(s, g_{\gamma_T}(\gamma)) \quad (1)$$

wherein for each summary statistic of n subjects the vector $\gamma=(\gamma_1, \ldots, \gamma_n)$;

wherein $\chi^2(s, g)$ is a function returning a test statistic of a survival analysis of subjects with survival times $s=(s_1, \ldots, s_n)$ assigned to groups $g=(g_1, \ldots, g_n)$, wherein $g_i$ is a member of a set of two or more survival groups, and wherein the test statistic is maximised when the groups are maximally distinct in terms of their survival characteristic; and wherein the function $g_{\gamma_T}$ returns a vector whose ith element is the group assignment of the ith subject resulting from the application of threshold $\gamma_T$ to each element of the vector $\gamma$.

Selecting Pairing ($d_P$) and Interaction Distances ($d_I$)

When imaging software is not able to segment individual cells or sub-cellular structures, the method of the present application uses the distances between proximal region centroid coordinates of markers or combinations of markers (x',y') to determine those regions most likely to be one cell or sub-cellular structure. This distance is the pairing distance, $d_P$.

Once distinct cells or sub-cellular structures are identified, it is possible to quantify how many pairs of particular cell or sub-cellular structure types are close together and thereby interacting. The "closeness" of particular types (i, j) being defined as those cells or sub-cellular structures within a given distance of one another: the interaction distance, $d_I$.

The distances $d_P$ and $d_I$ may be selected by the skilled person in the art by drawing upon their clinical or biological knowledge. Preferably, however, the distances are determined objectively rather than subjectively. This objective method may involve choosing optimal values for distances $d_P$ and $d_I$ statistically via the optimisation formula (2):

$$(d_I^*, d_P^*) = \arg\max_{d_I, d_P, \gamma_T} \chi^2(s, g_{\gamma_T}(\gamma(d_I, d_P))) \quad (2)$$

Formula (2) is a modification of formula (1) defined above, wherein $\gamma(d_I, d_P)$ returns the vector of summary statistics for HIDs computed using distances $d_I$ and $d_P$.

The topology of the $\chi^2$ function for each summary statistic can be represented by a contour plot of $d_I$ vs $d_P$ as shown in FIGS. 2 and 4. Optimal values of the interaction distance and pairing distance for each summary statistic may then be selected based on inspection of this contour plot. The scalar summary statistic used for the contour plot may be any one of the statistics defined above. For example, under the constraint $d_I < d_P$, (regions should be paired before considering whether paired regions interact) optimal values may be chosen where the contour plot appears "hottest" favouring $(d_I, d_P)=(0, 0)$, i.e. at (10, 7) in FIG. 2—the region of the figure labelled "10" which is closest to (0,0).

In a further embodiment, the pairing distance may not be required and the optimisation of the interaction distance, $d_I$, may be carried out as follows. Advantageously this embodiment of the method does not rely on the choosing of pairing and interaction distances by the user based on an initial analysis that produces the contour plot of the $\chi^2$ function.

The optimisation of the interaction distance comprises:
1. Specifying a number of interaction distances.
2. For each interaction distance:
   a) computing HID matrices as defined herein for each subject and each of their images;
   b) generating scalar summary statistics of these HID matrices as defined herein;
   c) obtaining an average of each scalar summary statistic as defined herein;
   d) defining a subset of these averages as a set of candidate thresholds for placing subjects into one of two groups,
     the subset may be defined by excluding an upper level and a lower level of values, such that the groups have approximately equal numbers of subjects;
     preferably the upper and lower levels are defined as percentiles of the averages—for example the upper level may correspond to the $60^{th}$, $65^{th}$, $70^{th}$, $75^{th}$, $80^{th}$, $85^{th}$, $90^{th}$ or $95^{th}$ percentile, preferably the $75^{th}$ percentile, and the lower level may correspond to the $40^{th}$, $35^{th}$, $30^{th}$, $25^{th}$, $20^{th}$, $15^{th}$, $10^{th}$ or $5^{th}$ percentile, preferably the $25^{th}$ percentile;
   e) for each candidate threshold:
    i) applying the threshold to the average of each scalar summary statistic of each subject to place the subject into one of the two groups; and
    ii) applying a time-to-event data analysis, e.g. a survival analysis, on the two groups, as described previously to obtain a value of a suitable test statistic, such as a $\chi^2$ value, for each scalar summary statistic, wherein the test statistic value measures whether the characteristics of the two groups are statistically significantly different.
   f) selecting the candidate threshold with the best test statistic value as the optimal threshold for this interaction distance.
3) selecting the interaction distance with the overall best test statistic and its associated threshold as the optimal interaction distance.

Once an optimal interaction distance and an optimal threshold have been identified, they may be used in the method of the present application as defined hereinabove.

We note that this embodiment has been described in terms of assigning the subject to one of two groups. This embodiment is not however limited in this respect and the skilled person would understand that it can be modified in order to be applicable to two or more groups.

In a preferred embodiment of this optimization method, the interaction distances specified are squared distances. The steps in (2) may then be carried out for each squared interaction distance.

A logrank hypothesis test may be performed on the two groups to obtain a $\chi^2$ value for each scalar summary statistic which measures whether the survival functions of the two groups are statistically significantly different. Event (e.g. survival) curves may also be constructed to estimate how well the method can discriminate between subjects with distinct event functions (e.g. survival functions) as herein described.

To use the method of the present application to predict whether a new subject will be assigned to one of two or more groups (e.g. long or short survival), sections from that subject may be imaged, processed to form HID matrices and their average summary statistic generated using the optimal interaction distance or squared interaction distance as described above. The optimal threshold described above may then be used to predict which one of two or more groups the subject is likely to belong. This information may potentially be used to begin, continue or stop treatment of a particular disease. This information may also more specifically be used for selection of a particular treatment. For example, if the subject is expected to have short survival, more radical treatment could be selected.

Information in the HID Matrix

The summary statistics considered above collapse a multivariate representation of the pairwise spatial relationships between cell types down to a scalar value. This potentially discards information contained in the HID matrix. The advantage of the scalar summary statistic approach is that it is simple to apply one or more thresholds to a scalar quantity. However, the inventors found that as a greater number of markers were used, the ability of a scalar summary to distinguish between subjects with long versus short survival diminished slightly. Without wishing to be bound by theory, it is believed that this is because multiple distinct HID matrices can have identical or similar scalar summary statistics.

In an alternative embodiment, the method of the present application may include directly relating the HID matrix to one or more clinical characteristic, this characteristic may be categorical or continuous, for example it may be a continuous characteristic such as survival time.

The method in this instance may involve a mathematical or algorithmic mapping function, from the space of the matrices (or preferably a vector space related to them), to a categorical or continuous space of a clinical characteristic of interest.

Such function may arise via regression analysis, preferably multivariate regression analysis, which may be linear or nonlinear regression analysis, e.g. support vector regression, random forest regression, neural network regression, and similar methods. The result should be a linear or nonlinear model that allows an HID matrix to be mapped to an estimate of one or more clinical characteristic.

For example, regression analysis could be used to map an HID matrix to a continuous variable such as the decrease in heart ventricle wall thickness after a subject has received a given treatment for a defined length of time, e.g. one year, where this decrease is associated with one or more clinical characteristic in the subject.

Such analysis may comprise:
1. Obtaining a scalar outcome value for the continuous variable. This may include:
   a) taking a cohort or group of subjects;
   b) measuring the variable in question (e.g. the thickness of their ventricle walls)
   c) computing the HID matrices for each of the subjects and generating a scalar summary statistic according to the method of the present application (e.g. by isolating heart tissue for each subject);
   d) placing the subjects on the given treatment for the defined length of time; and
   e) re-measuring the variable, re-computing the HID matrices and re-generating the scalar summary statistic after the defined length of time.

2. Defining a number of distinct interaction distances, preferably squared interaction distances.
3. For each of those interaction distances, leaving each subject out in turn;
   a) computing the HID matrix for each of the left-out subject's images.
   b) converting those matrices to a non-redundant vector representation as described herein.
   c) finding a linear or nonlinear regression function to map between the one or more non-redundant vectors for each subject and that subject's scalar outcome value.

Advantageously the method of the present application involves the formation of regression functions which map between multiple non-redundant vectors and a single scalar outcome value (i.e., there is a recognition that multiple vectors may belong to a single subject).

4. Assessing the performance of the regression function on the left-out subject by:
   a) computing the HID matrix for each of the left-out subject's images according to the method of the present application.
   b) converting those matrices to a non-redundant vector representation as described herein.
   c) applying the regression function to the one or more non-redundant vectors to determine the predicted value of the scalar outcome for the left-out subject.

In the case that the regression function is not able to directly produce a single scalar prediction based on multiple vectors, a prediction for each vector may be produced using the regression function and those predictions may be combined into a single prediction. One way in which predictions may be combined is to take their average, for example their mean:
   d) computing a value that characterises the performance (e.g., accuracy) of the prediction by comparing the scalar prediction to the known value of the scalar outcome—
      e.g. the square of the difference between the predicted and known scalar values may be computed—a more accurate prediction would have a smaller squared difference compared to a less accurate prediction.

5. Computing a value that characterises the performance of predictions at the current interaction distance—
      e.g. the above squared differences may be summed—interaction distances that yield more accurate predictions will have a smaller sum of squared differences compared to interaction distances that yield less accurate predictions.
6. Taking the interaction distance with the best performance (e.g., the lowest sum of squared differences) as optimal.

This optimal interaction distance may be used to make scalar predictions based on HID matrices according to the method of the present application.

As an alternative to predefining a number of interaction distances and performing the above steps for each interaction distance, an algorithmic search may be defined and performed for an optimal interaction distance, within a range of such distances (e.g., specified by the lower and upper bounds of the range of predefined interaction distances). Such a search could be performed using a method such as Newton's method, Nelder-Mead (simplex), and others known in the art.

As described herein, such mapping function may arise via statistical classification. This classification can be used to determine the relationship between an HID matrix and one or more categories (groups). For example, whether the heart ventricle wall thickness of a subject decreases sufficiently over a defined length of time (e.g. one year) as to indicate that the subject has heart disease, the two groups in this instance would be a subject with heart disease and a subject without heart disease.

Such a statistical classifier may be determined as follows:
1. Specifying a number of distinct interaction distances, preferably squared interaction distances.
2. Leaving, for each interaction distance, each subject out in turn and:
   a) computing the HID matrices using this interaction distance (for each left-in subject and each of their images); and
   b) converting each matrix to a non-redundant vector representation.

The non-redundant vector representation is formed from each matrix by concatenating part of each row of the matrix (or, equivalently, each column) as follows:
(i) concatenating the first row of the matrix with all the elements of the second row, except the very first element (as this is redundant with the second element of the first row of the matrix);
(ii) concatenating the result of step (i) with all the elements of the third row of the matrix, except the very first two elements (as these are also redundant with entries already concatenated);
(iii) concatenating the result of step (ii) with all the elements of the fourth row of the matrix, except the very first three elements; and so on for each row of the HID matrix.

The above procedure is described for a matrix that has size of at least 4×4, however it will be appreciated that if the matrix is smaller, only step (i) or steps (i) and (ii) will be necessary. Similarly if the matrix is larger, subsequent steps after (iii) will be required. It will also be appreciated that there exist other ways in which a non-redundant vector may be formed from a matrix, and that the method is not limited in this respect.

The result of concatenating part of each row of the matrix is a non-redundant vector for each image of each left-in subject.

c) given event data for the left-in subjects (e.g. the time from the start of the study to death or the end of the study), placing each subject into one of two or more groups.

The event data may be survival data, and may be used to place each subject into one of two of more groups by determining the median time for a clinical event (e.g. survival time) of all the subjects and using said median time as a threshold, although other rules known to the skilled person may be used.

d) given the non-redundant vectors and group memberships, building a classifier, so as to assign the left-out subject to the most appropriate group given their HID matrices.

Preferably the statistical classifier is a voting k-nearest neighbor classifier, wherein k is a positive odd integer, more preferably k=1. The building of such a voting k-nearest neighbor classifier may comprise:
   i. considering the non-redundant vectors and associated group membership data (e.g. survival group membership) as described above, where each left-in subject may have one or more such vectors (because more than one image is typically taken), as "training" data;
   ii. performing, for each of the left-out subject's non-redundant vectors, the following steps in order to identify the group, e.g. survival group, to which the subject most likely belongs:
      1. computing the magnitude or squared magnitude of the vector difference between the non-redundant vector and every non-redundant vector in the training data;

2. identifying the k smallest magnitudes or squared magnitudes and hence the k non-redundant vectors in the training set that are closest (within the multivariate space) to that of the non-redundant vector from the left-out subject; and
3. casting a vote in favor of the group (e.g. survival group) of this closest non-redundant vector from the training data, for the left-out subject, wherein if k>1 the vote cast is a majority vote.

iii. with each of the left-out subject's non-redundant vectors (and hence their HID matrices and their associated images) having had a vote cast for them in favor of one of the two or more groups, using the group receiving the most votes as the most likely group for the new subject.

If the vote is tied, an arbitrary assignment is made. This assignment could be random, or it could default to a particular group (e.g., if using the survival group membership to help in treatment selection, the default may be to the group that would receive the most radical therapy, or the least toxic, or similar). In apparatus implementing the method of the present application, this arbitrary assignment could be flagged so that the user would know that the group assignment is ambiguous.

Having performed the above steps with all of the subjects being left out for one interaction distance, each subject will have been assigned to one of two or more groups. The method then comprises:

e) performing a time-to-event data analysis, e.g. a survival analysis, preferably a logrank hypothesis test analysis, to obtain a test statistic value, which may be a $\chi^2$ value which measures whether the event functions (e.g. survival functions) of the two or more groups are statistically significantly different.

3. Selecting the squared interaction distance with the best test statistic value (e.g. maximum $\chi^2$).

The results of the above steps can then be used to report the best test statistic value and its associated P-value, and to construct leave-one-out validated estimates of the event functions of the two or more groups, as described above.

While the above embodiment uses a k-nearest neighbour in a voting classifier, other possibilities exist and any suitable classification method known to the skilled person in the art could be used (e.g., linear discriminant, neural network, support vector machine, random forest).

Advantageously this approach to the information contained in each HID matrix allows subsequent steps to be performed in an unbiased way.

To use this embodiment of the method to predict whether a new subject will have one or more clinical characteristic (e.g. long or short survival), sections from that subject may be imaged, processed, the HID matrices computed using the optimal interaction distance, their non-redundant vectors computed, and the subject classified using a voting classifier, as described above defined using all suitable data. This information could potentially be used to make treatment or other scientific, medical or commercial decisions, as discussed herein.

Advantageously, the method of the present application allows the identification of which pairs of cell types carry prognostic or predictive information. This could also be achieved using appropriate statistical or machine learning methods. For example, the L1 support vector machine is able to identify "noise variables" (here pairs of cell types that do not carry prognostic or predictive information), and the random forest provides similar information. Knowing this information would provide guidance as to which biomarkers should be used for diagnosis, prognosis and/or prediction in specific diseases, particularly within the HID analysis framework.

Uses

The method of the present application has two main uses. Firstly as a research tool, quantifying spatial distributions of cells or sub-cellular structures for particular biological scenarios, and secondly as a clinical tool, relating spatial biomarker data to clinically meaningful characteristics. These two uses are interconnected since once a spatial distribution has been analysed in a research context, it may be used clinically to stratify subjects and direct treatment according to disease diagnosis/outcome/prognosis as appropriate.

In the context of research, the method can be used for forming and/or testing scientific hypotheses for one or more interventions. By "forming and/or testing scientific hypotheses" is meant quantifying patterns of biomarkers which are indicative of diagnosis, prognosis or treatment of a disease including assessing the toxicity (safety) and/or efficacy of one or more treatments, e.g. a new or known drug. In this way, the method may be used to analyse and/or explore models of a particular disease—such as animal or other tissue models. For example, a skilled person may wish to test the null hypothesis that a spatial pattern of cells or sub-cellular structures is identical in a control and a treated sample.

The hypothesis may also include whether there is a difference between one or more interventions. For example, whether the spatial arrangement (distribution) of cell or sub-cellular types differs between two or more disease subtypes). It may, for instance be hypothesised that there is only one type of a particular disease, but the method of the present application may be used to determine/demonstrate that there are two or more subtypes. This information may then be useful for developing or choosing treatments.

By the term "intervention" is meant any external influence on a subject. The intervention may be biological, chemical or physical and includes: bacteria; viruses; fungi and other microorganisms; drugs; chemotherapy; radiotherapy; surgery; organ, tissue, or cell transplantation; application of thermal, sonic, photonic (laser), electromagnetic or other energy; stem cell therapy; gene therapy; psychological stress; change in environment or habit (e.g., occupation, working hours).

The use of the method for forming and/or testing scientific hypotheses may comprise applying one or more interventions to one or more subjects, quantifying the spatial distribution of cells or sub-cellular structures of the subject according to the HID matrix method described above, and then comparing said quantified spatial distribution to one or more predetermined reference or control for said one or more interventions, wherein the comparison is indicative of said scientific hypothesis. For example, a skilled person may test the null hypothesis that a spatial pattern of cells or sub-cellular structures is identical in a control and a sample treated with one or more interventions. The HID matrices may therefore be used to diagnose a disease, to assess the stage of a disease and/or to select between a plurality of treatments.

Prior to the application of one or more interventions, the subject's spatial distribution of cells or sub-cellular structures may optionally be quantified. This prior quantification allows the effect of the intervention on the spatial distribution of cells or sub-cellular structures to be determined.

The scientific hypotheses for the interventions may be associated with diagnosis, prognosis and/or treatment of a disease and may relate to continuous or categorical variables.

For example, the method of the present application may be used to quantify a spatial distribution of cells or subcellular structures (i.e. a pattern) which can then be used to diagnose a disease, e.g. for recognising a disease and/or for characterising its progression. Patterns can for instance be defined for different stages of a disease.

The method of the present application may also be used to define patterns indicative of disease prognosis, including patterns relating to duration (e.g. survival time), function, and description of the course of a disease (e.g. progressive decline, and intermittent or sudden, unpredictable crisis). Advantageously, defining prognosis patterns enables a skilled person to determine whether to attempt or withhold certain treatments of a disease. In other words, to make treatment decisions for the subject.

The method of the present application may be used to define a pattern indicative of a continuous variable associated with survival of a disease, preferably the length of time (in days, months or years) during and/or after a certain treatment during which the disease being treated does not get worse. This is otherwise defined as progression-free survival.

The method of the present application may also be used to define a pattern for a categorical variable associated with survival of a disease. For example, a particular survival rate–% of subjects in a study or treatment group who are alive for a given period of time after diagnosis. A treatment group could be subjects receiving different types of treatment in a trial or subjects with different values for a biomarker (as in the Examples for entropy values above or below the median value).

A pattern may also be defined for a category associated with survival time of a disease. By survival time is meant the remaining duration of life from a clinical event. A clinical event is a point in time associated with the disease and includes diagnosis, before or after treatment, relapse, remission and progression. The clinical event is not limited and includes any clinical event known to the skilled person.

The method of the present application may also be used for forming and/or testing scientific hypotheses relating to the treatment of a subject. For example, to test the effect of known treatments for a particular disease vs. a control and/or to determine the effect of new treatments on a particular subject either vs. a control or vs. known treatments. These comparisons can be used to assess the safety and efficacy of novel treatments.

In forming and/or testing scientific hypotheses, the method may involve "paired" or "unpaired" experiments. By "paired" is meant that there is no separate control group and a before versus after comparison is made on the same subjects. By "unpaired" is meant there may be one set of subjects that form a control and another set of subjects that form a treated group. At a more general level, the method may involve longitudinal experiments where a single group is followed over multiple experimental conditions, with comparisons made to the first, and possible one or more subsequent, condition; or there can be one control groups and multiple treatment groups (e.g., each group may be on a different dose of a particular drug). The skilled person in the art would realise that the use of the method of the present application is not limited in this respect and will include any manner of forming or testing scientific hypotheses as is known in the art.

In the context of clinical use, the method of the present application may be used to assign to a subject one or more clinical characteristic. This assignment may rely on the scientific hypotheses formed and tested as described above.

In the context of the present application, the term "clinical" has its normal meaning in the art. It is associated with a subject and refers to a feature or characterisation of a particular disease. Such features are strictly objective and may include disease free survival, progression free survival, remission after first treatment, relapse after treatment, survival time and survival rate.

The clinical characteristic may be categorical or continuous. The characteristic preferably indicates outcome for a particular disease, i.e. survival time or rate of a subject after a clinical event associated with a disease. The clinical event may be diagnosis, initiation of treatment, relapse, remission, finishing a course of treatment, treatment for a certain period of time etc. For example, the characteristic may be a category that indicates how long the subject may survive after an event associated with the diagnosis and/or prognosis of a disease before, after or during treatment.

More preferably, by "outcome" it is meant a categorical outcome. For example, the categories may be good and poor survival where "good" survival corresponds to a longer survival time than "poor" survival. For example a survival time of 142 months would be "good" survival when compared with a survival time of 35.5 months for "poor" survival. Good v poor are also defined herein as favourable v unfavourable and long v short—all are relative terms dependent on the disease under consideration.

The method of the present application may therefore be used to assign a subject into one of two or more groups based on their survival of a particular disease. The assignment of a characteristic may also be made between different groups or cohorts of subjects. For example, patients receiving different types of treatment in a trial or patients with different values for a biomarker (as in the Examples for entropy values above or below the median value).

The method described herein may therefore be used to generate spatial distributions "typical" for subjects in the group to which they were assigned, providing clinicians with examples of images for stratify subjects and directing treatment accordingly, e.g. begin, continue or stop treatment of a particular disease. For example, if the subject is characterised as having a short survival time, a more radical treatment could be selected.

Two different subject groups are compared in the below Examples but the use of the method of the present application is not limited in this respect and any number, i.e. more than 2, different subject groups may be compared.

The approach described herein will now be further illustrated with reference to the following non-limiting examples.

EXAMPLES

Chemicals and solvents were purchased from commercial sources and were used as received unless otherwise stated.

Example 1—Study of Follicular Lymphoma

This example applied the method of the present application to the study of follicular lymphoma. In particular, the method was applied to data from multispectral microscopy of multiply-stained tissue sections from a sample of follicular lymphoma (FL) subjects, and used to identify subject groups that differ in survival.

Subjects and Samples

Twenty six archived human lymph nodes from subjects (16 male, 10 female, aged 36-77 years, mean 55 years) with a diagnosis of FL were collected at initial diagnosis, prior to the treatment. Written informed consent and local research ethics committee approval were obtained. The material was routinely processed by fixation in formalin and paraffin embedding. Clinical data and up to 14 years of follow-up and survival data were available for each sample (19 dead, 7 alive; median time to death 32 months; range 2-170 months; 171 months follow-up in all subjects alive at the end of the study period). Paraffin-embedded sections from these cases were reviewed by two pathologists.

Duplex quantum dot-based immunofluorescence was used to co-localize YY1 with CD20 using a duplex QD-IF protocol. Briefly, tissue sections were subjected to antigen retrieval by microwave heating in Tris-EDTA buffer and incubated with YY1 monoclonal primary antibody (Santa Cruz Biotechnology, Santa Cruz, Calif., USA) diluted 1:50 (v/v) in 1:10 (v/v) goat serum overnight at 4° C. Secondary detection was performed using a goat anti-mouse secondary antibody diluted 1:250 (v/v) in 1:10 (v/v) goat serum, followed by 655 nm quantum dot solution (Invitrogen, Carlsbad, Calif., USA) (1:50 (v/v) in 1:10 (v/v) goat serum). Sections were washed and incubated with Avidin solution followed by incubation with Biotin solution (Vector Laboratories, Burlingame, Calif., USA). An anti-CD20 monoclonal primary antibody (Dako, Glostrup, Denmark) diluted 1:50 (v/v) in 1:10 (v/v) goat serum was then applied for 1 hour at room temperature. Secondary detection was performed using the same protocol as for YY1 with the exception of use of a 605 nm quantum dot solution (Invitrogen) diluted 1:50 (v/v) in 1:10 (v/v) goat serum. Finally, sections were rinsed and mounted in polyvinyl mounting medium with DABCO (Sigma-Aldrich, St. Louis, Mo., USA) and sealed with clear nail varnish.

Areas positive for YY1 or CD20 expression were identified by spectral imaging using a LeitzDiaplan fluorescence microscope and a Nuance spectral analyzer. Image cubes were collected and subjected to spectral unmixing using Nuance software version 2.4.2 to generate 2D intensity distributions of YY1 and CD20 positivity; up to five images from different portions of each specimen were taken to help ensure that inferred characteristics were representative. Composite images taken of sections double stained for YY1 and CD20 were unmixed using spectra for 605 nm and 655 nm quantum dots and the resultant 2D intensity maps for each of YY1 and CD20 thresholded to generate biologically relevant positive regions of interest; regions of interest were at least 100 pixels in area.

Region centroid co-ordinates, region area, maximum intensity, and average intensity were exported to Excel (Microsoft Corporation, Redmond, Wash. USA). All images were captured at a total magnification of 400× with standardized and uniform image illumination and magnification such that all images captured were directly comparable in terms of intensity and scale.

Very large regions—representing incorrect discrimination between distinct cells—were rejected by discarding regions with area greater than 200 pixels. The topology of the $\chi^2$ function (formula 2) for each summary statistic was estimated via thin plate spline interpolation of values of the $\chi^2$ function computed on a regular 14×24 grid of $(d_I, d_P)$ values. The $\chi^2$ function is computationally expensive to compute and tends to have multiple maxima. Optimal values were therefore selected for $d_I$ and $d_P$ for each summary statistic by inspecting contour plots, favoring maxima near $(d_I, d_P)=(0, 0)$.

Approximate CMPs, HIDs, and their summary statistics were constructed for each image. Each subject was represented by the median of each summary statistic, taken over all images acquired for the subject.

Finally, Kaplan-Meier survival curves were estimated using leave-one-out validation: At the $i^{th}$ iteration, the $i^{th}$ subject was left out of the analysis and an optimal threshold for each summary statistic calculated for the left-in subjects (formula 1); this threshold was used to allocate the left-out subject to one of two groups. Software was implemented in R version 2.13.0.

Results

FIG. 2 shows the topology of the objective function (formula 2) for H(D) under the constraint that $d_P<d_I$. From this plot, the optimal pairing and interaction distances selected for the entropy analysis, were $d_P^*=7$ and $d_I^*=10$, respectively (both measured in pixels using ×400 magnification and a LeitzDiaplan fluorescence microscope and a Nuance spectral analyser). This corresponds to the red area in FIG. 2—not labelled but corresponding to "7" on the key for this figure.

The table below shows the results of the leave-one-out survival analyses and the $(d_I^*, d_P^*)$ used for each of summary statistic.

| Statistic | $d_I^*$ (in pixels) | $d_P^*$ (in pixels) | P-value |
|---|---|---|---|
| $D_E$ | 110 | 32 | 0.921 |
| H(D) | 10 | 7 | 0.00750 |
| $D_{max}$ | 50 | 27 | 0.675 |

It can be seen from this table that there was a statistically significant difference (P-value less than 0.05) between the survival curves defined by the summary statistic H(D), but not for $D_{max}$ and $D_E$. The P value for H(D) would survive Bonferroni correction for multiple comparisons at the $\alpha=0.05$ significance level.

Kaplan-Meier survival curves for H(D)—estimated via leave-one-out validation—are shown in FIG. 3. From these, median survival for the two groups was calculated as approximately 7.70 and 110 months. Low H(D) was associated with poor survival and these peaks were often observed for hypothesized interactions between cells that were positive for both YY1 and CD20. FIG. 1 shows example HIDs and their graphs for subjects with poor ($D_1$) versus good ($D_2$) survival.

Example 2—Alternative Study of Follicular Lymphoma

A tissue microarray comprising 40 FL samples was used in triplex immunohistochemistry for FOXP3, CD3 and CD69. Multispectral imaging was used to determine the spatial locations of FOXP3 and CD69 positive T-cells which were used in HID analysis according to the method of the present application to assess prognostic significance of cellular patterns quantified by Shannon entropy.

The method used for Example 2 corresponds to that of Example 1, except a larger number of subjects were used with different biomarkers.

From the contour plot in FIG. 4, the optimal pairing and interaction distances of $d_P=13$ and $d_I=60$, were determined (both measured in pixels using a ×400 magnification and a LeitzDiaplan fluorescence microscope and a Nuance spectral analyser as used in Example 1). These optimal distances can be obtained by calculating the "hottest" point of the region of the contour plot marked as "10" (i.e. towards the upper end of the key for the contour plot), favouring the (0,0) grid point. For FIG. 4 there are two "10" regions, and the region nearest (0,0) has a "hottest" point of (13, 60).

HID analysis then identified two groups with higher (2.42) and lower (0.36) median entropy. Higher entropy corresponds to longer median survival (142 months) compared to lower entropy (35.5 months). This shown in the plot of Kaplan-Meier estimates in FIG. 5.

Since higher entropy reflects a more diffuse cellular pattern, a diffuse pattern of FOXP3 and CD69 positivity was associated with better outcome.

These results therefore demonstrate the ability of the method of the present application to automatically identify prognostic patterns of cellular distribution, demonstrating favourable outcome of a diffuse pattern of FOXP3 and CD69 cells in follicular lymphoma.

In general terms, the classifier used herein to assign a subject to a group or category may be a statistical classifier, or may use approaches such as machine learning or fuzzy logic for the classifier. The imaging data acquired and processed herein may be 2-dimensional (e.g. from a slide), having (x, y) coordinates, or may be 3-dimensional (e.g. obtained from a set of adjacent slices through a volume), having (x, y, z) coordinates. In the event of a tie in the k-nearest neighbour voting, the default setting might be to take the most conservative option, e.g. to err on the side of caution. The HID matrices described herein may be used (potentially in their form as non-redundant vectors) for performing a multivariate survival analysis, including but not limited to Cox proportional hazards analysis and random survival forest analysis, which can be used (for example) to help identify specific cell types that are related to survival.

References herein to a method of the invention, a method of the application, etc should be understood as referring to all the various methods and embodiments described herein. References to an embodiment should be understood as to referring to all implementations sharing certain features and it will be appreciated that features from different embodiments may be readily combined to create various implementations of the method of the application.

Various modifications and variations of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes for carrying out the invention which are obvious to those skilled in the relevant fields are intended to be covered by the present invention.

The invention claimed is:

1. A computer-implemented method, comprising:
applying one or more interventions to a subject;
by a computer, quantifying the spatial distribution of cells or sub-cellular structures of the subject by:
 (a) receiving, for the subject, image data comprising a plurality of biomarkers, N, wherein the image data represents a spatial map of the biomarkers;
 (b) processing the image data to obtain a set of coordinates, wherein each coordinate in the set of coordinates denotes the location of a cell or sub-cellular structure represented by a biomarker or combination of biomarkers;
 (c) processing the set of coordinates into a two-dimensional symmetric $(2^N-1)\times(2^N-1)$ or $2^N\times2^N$ matrix (D), wherein each element (i, j) of the matrix indicates the frequency of a cell or sub-cellular structure represented by a first biomarker or combination of biomarkers (i) being observed within an interaction distance, $d_I$, of a cell or sub-cellular structure represented by a second biomarker or combination of biomarkers (j), and wherein i and j may be the same or different, the two-dimensional symmetric matrix (D) providing a quantified spatial distribution of cells or sub-cellular structures of the subject; and
 (d) using a classifier to assign the subject to a group or category based on the two-dimensional symmetric matrix (D);
the method further comprising, by the computer:
 comparing the quantified spatial distribution to one or more predetermined reference or control distributions for the one or more interventions to identify differences in the distribution of cells or sub-cellular structures of the subject between the quantified spatial distribution and the one or more predetermined reference or control distributions, and utilizing the comparison for forming and/or testing a scientific hypothesis for the one or more interventions, wherein the comparison is indicative of the scientific hypothesis; and
 based on the comparison, assessing a toxicity and/or efficacy of the one or more interventions.

2. The method of claim 1, further comprising the computer converting the matrix D to a non-redundant vector representation for use by the classifier.

3. The method of claim 2, wherein the converting is performed by concatenating rows or columns of the D matrix, and discarding redundant elements of the D matrix.

4. The method of claim 1, wherein the classifier is a statistical classifier.

5. The method of claim 1, wherein the classifier is a voting classifier.

6. The method of claim 5, wherein the classifier is a voting k-nearest neighbor classifier.

7. The method of claim 6, wherein k is a positive odd integer.

8. The method of claim 7, wherein k=1.

9. The method of claim 6, further comprising the computer determining the classifier using a set of images from a plurality of subjects by:
 (i) specifying a set of distinct interaction distances; and
 (ii) leaving, for a particular interaction distance from the set of distinct interaction distances, each subject out in turn and:
  (a) computing the D matrix using the particular interaction distance for each image of each left-in subject;
  (b) converting each D matrix to a non-redundant vector representation; and
  (c) given event data for each left-in subject, placing each left-in subject into one of two or more groups or classifications.

10. The method of claim 9, wherein converting each matrix D to a non-redundant vector representation for use by the classifier is performed by concatenating rows or columns of the D matrix, and discarding redundant elements of the D matrix.

11. The method of claim 9, wherein the voting k-nearest neighbor classifier is built using non-redundant vectors and associated group membership data for said plurality of subjects, where each subject may have one or more such vectors as training data, the method further comprising performing, for each of a left-out subject's non-redundant vectors, the following steps in order to identify the group to which the left-out subject most likely belongs:
  (a) computing the magnitude of the vector difference between the non-redundant vector of the left-out subject and every non-redundant vector in the training data for the left-in subjects;
  (b) identifying the k smallest magnitudes and hence the k non-redundant vectors in the training set that are closest, within the multivariate vector space, to the non-redundant vector from the left-out subject; and
  (c) casting a vote in favor of the group associated with this closest non-redundant vector from the training data, for the left-out subject.

12. The method of claim 11, further comprising the computer identifying the group receiving the most votes as the most likely group for the left-out subject.

13. The method of claim 11, wherein if k>1, the votes are cast on a majority basis.

14. The method of claim 13, wherein if k is even and the vote is tied, an assignment of the most likely group is made on an arbitrary, random, or default basis.

15. The method of claim 9, such that after each subject has been left out for the particular interaction distance, each subject will have been assigned to one of two or more groups.

16. The method of claim 15, further comprising the computer obtaining a test statistic value to determine whether the event data of the two or more groups are statistically significantly different.

17. The method of claim 16, wherein said test statistic value comprises a $\chi^2$ value.

18. The method of claim 16, further comprising the computer determining the test statistic value for various interaction distances in the set of distinct interaction distances and selecting the interaction distance that has the best value for the test statistic to derive said classifier.

19. The method of claim 9, wherein the event data relate to survival times.

20. The method of claim 19, wherein the event data indicate how long the subject may survive after a clinical event associated with a disease.

21. The method of claim 20, wherein the clinical event is selected from diagnosis, beginning treatment, finishing treatment, relapse after treatment and remission after treatment.

22. The method of claim 19, wherein the groups or categories to which the subject is to be assigned relate to survival time or expectation.

23. The method of claim 1, wherein the set of coordinates in step (b) are a set of (x,y) coordinates.

24. The method of claim 23, wherein step (b) comprises the computer processing the image data to obtain a set of spatial coordinates (x',y'), wherein each spatial coordinate denotes the location of a group of one or more cells or sub-cellular structures represented by the biomarker or combination of biomarkers.

25. The method of claim 24, wherein step (b) further comprises the computer:
  processing the image data to obtain (i) the set of spatial coordinates (x',y'), wherein each spatial coordinate denotes the location of a group of one or more cells or sub-cellular structures represented by the biomarker or combination of biomarkers, and (ii) a set of region areas, wherein each area represents the two-dimensional surface of each group represented by the biomarker or combination of biomarkers;
  defining a maximum area for individual cells or sub-cellular structures in the image;
  discarding groups with region areas larger than the maximum area; and
  combining the spatial coordinates (x',y') that are within a pairing distance, $d_p$, of each other to obtain the set of (x,y) coordinates.

26. The method of claim 23, wherein step (c) comprises the computer:
  forming a two-dimensional, symmetric intermediate matrix, wherein each element of the intermediate matrix indicates the distance between every combination of coordinates (x,y) or (x,y,z), and
  discarding, for each row or column of the intermediate matrix, the entries equal to zero or greater than the interaction distance $d_I$.

27. The method of claim 1, wherein the set of coordinates in step (b) are a set of (x,y,z) coordinates.

28. The method of claim 27, wherein step (b) comprises the computer processing the image data to obtain a set of spatial coordinates (x',y',z'), wherein each spatial coordinate denotes the location of a group of one or more cells or sub-cellular structures represented by the biomarker or combination of biomarkers.

29. The method of claim 28, wherein step (b) further comprises the computer:
  processing the image data to obtain (i) the set of spatial coordinates (x',y',z'), wherein each spatial coordinate denotes the location of a group of one or more cells or sub-cellular structures represented by the biomarker or combination of biomarkers, and/or (ii) a set of volumes, wherein each volume represents the three-dimensional volume of each group represented by the biomarker or combination of biomarkers;
  defining a maximum volume for individual cells or sub-cellular structures in the image;
  discarding groups with volumes larger than the maximum volume; and
  combining the spatial coordinates (x',y',z') that are within a pairing distance, $d_p$, of each other to obtain the set of (x,y,z) coordinates.

30. The method of claim 1, wherein step (c) comprises the computer:
  (i) assigning a binary vector $\pi=(\pi_{s_1}, \ldots, \pi_{s_N})$ to each set of coordinates (x,y) or (x,y,z) to confirm the presence of a biomarker, wherein $S_k$ denotes the kth marker; and
  (ii) assigning a number to each binary vector, wherein the number represents a matrix row or column index number.

31. The method of claim 30, wherein the number is assigned in step (ii) according to a binary place-value scheme.

32. The method of claim 1, wherein the frequency is the relative frequency.

33. The method of claim 1, wherein the image data is obtained from a tissue sample.

34. The method of claim 33, wherein the tissue sample is isolated from a malignant tumour.

35. The method of claim 1, wherein N is at least two.

36. A non-transitory computer-readable medium having an executable computer program having instructions stored thereon, wherein, in response to execution, the program instructions cause a computer to:
  (a) receive, for a subject to whom one or more interventions have been applied, image data comprising a plurality of biomarkers, N, wherein the image data represents a spatial map of the biomarkers;

(b) process the image data to obtain a set of coordinates, wherein each coordinate in the set of coordinates denotes the location of a cell or sub-cellular structure represented by a biomarker or combination of biomarkers;

(c) process the set of coordinates into a two-dimensional symmetric $(2^N-1)\times(2^N-1)$ or $2^N\times2^N$ matrix (D), wherein each element (i, j) of the matrix indicates the frequency of a cell or sub-cellular structure represented by a first biomarker or combination of biomarkers (i) being observed within an interaction distance, $d_I$, of a cell or sub-cellular structure represented by a second biomarker or combination of biomarkers (j), and wherein i and j may be the same or different, the two-dimensional symmetric matrix (D) providing a quantified spatial distribution of cells or sub-cellular structures of the subject;

(d) use a classifier to assign the subject to a group or category based on the two-dimensional symmetric matrix (D);

(e) compare the quantified spatial distribution to one or more predetermined reference or control distributions for the one or more interventions to identify differences in the distribution of cells or sub-cellular structures of the subject between the quantified spatial distribution and the one or more predetermined reference or control distributions, wherein the comparison is useable for forming and/or testing a scientific hypothesis for the one or more interventions and the comparison is indicative of the scientific hypothesis; and (f) based on the comparison, assess a toxicity and/or efficacy of the one or more interventions.

37. An apparatus comprising at least one processor configured to operate according to executable instructions that, when executed by the processor, cause the processor to:

(a) receive, for a subject to whom one or more interventions have been applied, image data comprising a plurality of biomarkers, N, wherein the image data represents a spatial map of the biomarkers;

(b) process the image data to obtain a set of coordinates, wherein each coordinate in the set of coordinates denotes the location of a cell or sub-cellular structure represented by a biomarker or combination of biomarkers;

(c) process the set of coordinates into a two-dimensional symmetric $(2^N-1)\times(2^N-1)$ or $2^N\times2^N$ matrix (D), wherein each element (i,j) of the matrix indicates the frequency of a cell or sub-cellular structure represented by a first biomarker or combination of biomarkers (i) being observed within an interaction distance, $d_I$, of a cell or sub-cellular structure represented by a second biomarker or combination of biomarkers (j), and wherein i and j may be the same or different, the two-dimensional symmetric matrix (D) providing a quantified spatial distribution of cells or sub-cellular structures of the subject;

(d) use a classifier to assign the subject to a group or category based on the two-dimensional symmetric matrix (D);

(e) compare the quantified spatial distribution to one or more predetermined reference or control distributions for the one or more interventions to identify differences in the distribution of cells or sub-cellular structures of the subject between the quantified spatial distribution and the one or more predetermined reference or control distributions, wherein the comparison is useable for forming and/or testing a scientific hypothesis for the one or more interventions and the comparison is indicative of the scientific hypothesis; and (f) based on the comparison, assessing a toxicity and/or efficacy of the one or more interventions.

38. A computer-implemented method comprising the following steps performed by a computer:

(a) receiving, for a subject to whom one or more interventions have been applied, image data comprising a plurality of biomarkers, N, wherein the image data represents a spatial map of the biomarkers;

(b) processing the image data to obtain a set of coordinates, wherein each coordinate in the set of coordinates denotes the location of a cell or sub-cellular structure represented by a biomarker or combination of biomarkers;

(c) processing the set of coordinates into a two-dimensional symmetric $(2^N-1)\times(2^N-1)$ or $2^N\times2^N$ matrix (D), wherein each element (i,j) of the matrix indicates the frequency of a cell or sub-cellular structure represented by a first biomarker or combination of biomarkers (i) being observed within an interaction distance, $d_I$, of a cell or sub-cellular structure represented by a second biomarker or combination of biomarkers (j), and wherein i and j may be the same or different, the two-dimensional symmetric matrix (D) providing a quantified spatial distribution of cells or sub-cellular structures of the subject; and (d) using the two-dimensional symmetric matrix (D) for a multivariate survival analysis;

the method further comprising:
  comparing the quantified spatial distribution to one or more predetermined reference or control distributions for the one or more interventions to identify differences in the distribution of cells or sub-cellular structures of the subject between the quantified spatial distribution and the one or more predetermined reference or control distributions, and utilizing the comparison for forming and/or testing a scientific hypothesis for the one or more interventions, wherein the comparison is indicative of the scientific hypothesis; and
  based on the comparison, assessing a toxicity and/or efficacy of the one or more interventions.

39. The method of claim 38, wherein the matrix D is converted to a non-redundant vector representation for use in the multivariate survival analysis.

40. The method of claim 39, wherein the multivariate survival analysis comprises Cox proportional hazards analysis or random survival forest analysis.

* * * * *